(12) United States Patent
Reck et al.

(10) Patent No.: US 9,658,123 B2
(45) Date of Patent: May 23, 2017

(54) ALL-OPTICAL PRESSURE SENSOR

(71) Applicant: Technical University of Denmark, Lyngby (DK)

(72) Inventors: Kasper Reck, Herringløse (DK); Christian Østergaard, Copenhagen (DK); Ole Hansen, Hørsholm (DK); Erik Vilain Thomsen, Lynge (DK)

(73) Assignee: Technical University of Denmark (DK)

( * ) Notice: Subject to any disclaimer, the term of this patent is extended or adjusted under 35 U.S.C. 154(b) by 4 days.

(21) Appl. No.: 14/896,357

(22) PCT Filed: Jun. 4, 2014

(86) PCT No.: PCT/EP2014/061625
§ 371 (c)(1),
(2) Date: Dec. 4, 2015

(87) PCT Pub. No.: WO2014/195372
PCT Pub. Date: Dec. 11, 2014

(65) Prior Publication Data
US 2016/0123829 A1  May 5, 2016

(30) Foreign Application Priority Data

Jun. 6, 2013 (EP) .................................... 13170867
Dec. 12, 2013 (EP) .................................... 13196824

(51) Int. Cl.
*G01L 9/00* (2006.01)
*G01L 23/16* (2006.01)
*H04R 23/00* (2006.01)

(52) U.S. Cl.
CPC ............ *G01L 9/0076* (2013.01); *G01L 23/16* (2013.01); *H04R 23/008* (2013.01); *H04R 2201/003* (2013.01)

(58) Field of Classification Search
None
See application file for complete search history.

(56) References Cited

U.S. PATENT DOCUMENTS 4,523,474 A   6/1985  Browne et al. ................. 73/724
9,528,893 B2 * 12/2016  Wang ...................... G01L 7/086
(Continued)

FOREIGN PATENT DOCUMENTS

WO    WO 2013/182643 A1   12/2013   ............. G01L 11/02

OTHER PUBLICATIONS

Østergaard, "MEMS Optical Strain Sensors Based on Hollow Core Waveguides with Integrated Bragg Gratings," M.Cs Thesis, Technical University of Denmark, 173 pages, Feb. 2011.
(Continued)

*Primary Examiner* — Andre Allen
(74) *Attorney, Agent, or Firm* — Sunstein Kann Murphy & Timbers LLP

(57) ABSTRACT

The present invention relates to an all-optical pressure sensor comprising a waveguide accommodating a distributed Bragg reflector. Pressure sensing can then be provided by utilizing effective index modulation of the waveguide and detection of a wavelength shift of light reflected from the Bragg reflector. Sound sensing may also be provided thereby having an all-optical microphone. One embodiment of the invention relates to an optical pressure sensor comprising at least one outer membrane and a waveguide, the waveguide comprising at least one core for confining and guiding light, at least one distributed Bragg reflector located in said at least one core, and at least one inner deflecting element forming at least a part of the core, wherein the pressure sensor is configured such that the geometry and/or dimension of the at least one core is changed when the at least one outer membrane is submitted to pressure.

25 Claims, 22 Drawing Sheets

(56) References Cited

U.S. PATENT DOCUMENTS

| 2015/0131100 | A1* | 5/2015 | Reck | G01L 11/02 |
| | | | | 356/445 |
| 2015/0177132 | A1* | 6/2015 | Pechstedt | G01K 11/3206 |
| | | | | 356/517 |
| 2015/0285699 | A1* | 10/2015 | Brinciotti | G01L 11/02 |
| | | | | 356/32 |

OTHER PUBLICATIONS

Reck, "MEMS Optical Sensor Systems," Ph.d. Thesis, Technical University of Denmark, 128 pages, Sep. 2011.
Benaissa, et al., "Silicon anti-resonant reflecting optical waveguides for sensor applications," Sensors and Actuators A 65, pp. 33-44, 1998.
European Patent Office, International Search Report, International Application No. PCT/EP2014/061625, 4 pages, Nov. 6, 2014.
European Patent Office, International Preliminary Report on Patentability, International Application No. PCT/EP2014/061625, together with the Written Opinion of the International Searching Authority, 17 pages, Feb. 12, 2015.
Reck, et al., "Hollow Core Moems Bragg Grating Microphone for Distributed and Remote Sensing," Transducers '11, 4 pages, Jun. 5-9, 2011.

* cited by examiner

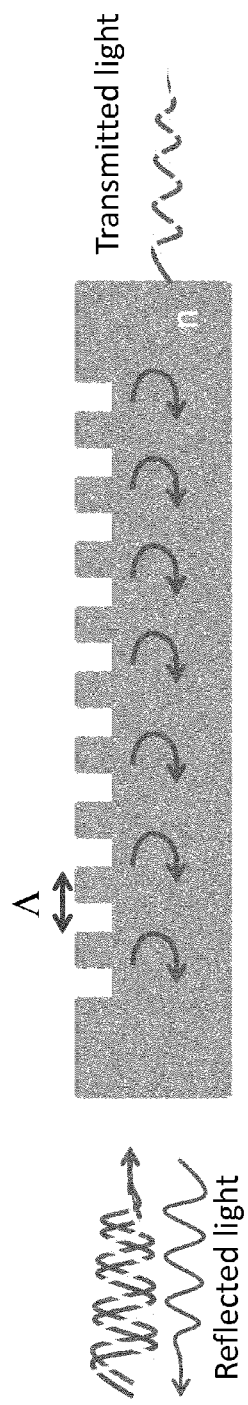
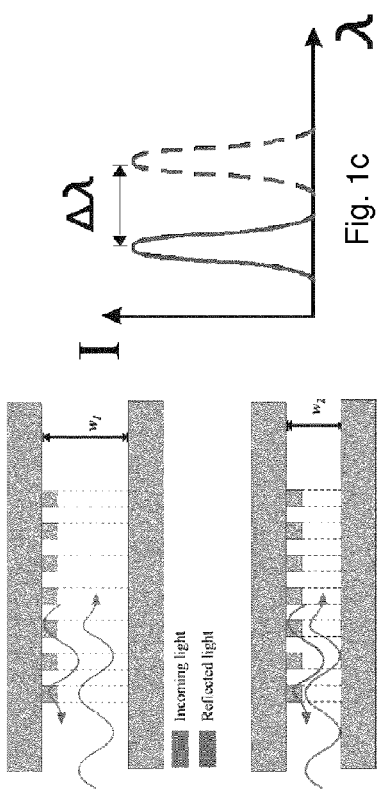
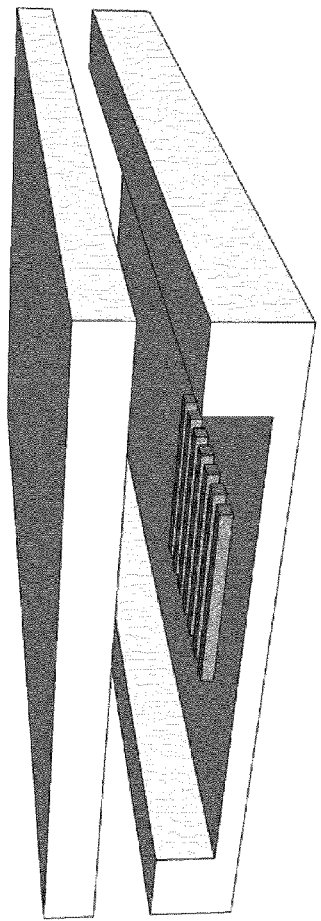
Fig. 1a
Fig. 1b
Fig. 1c
Fig. 1d

Prior art optical microphones

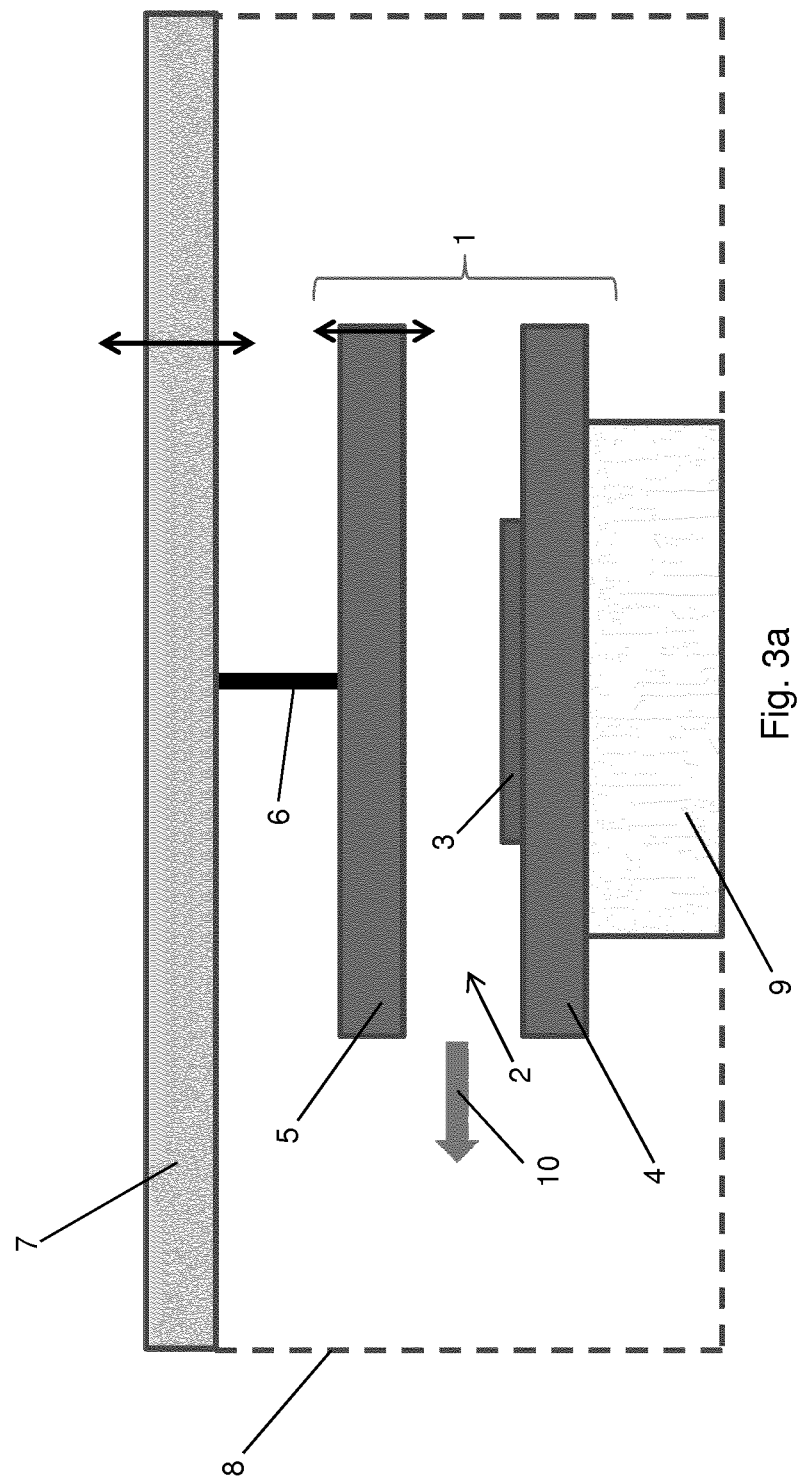

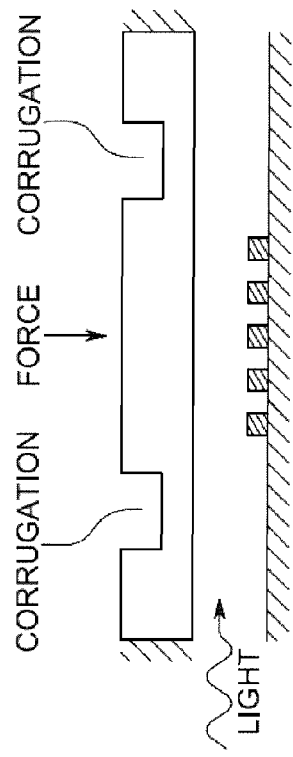
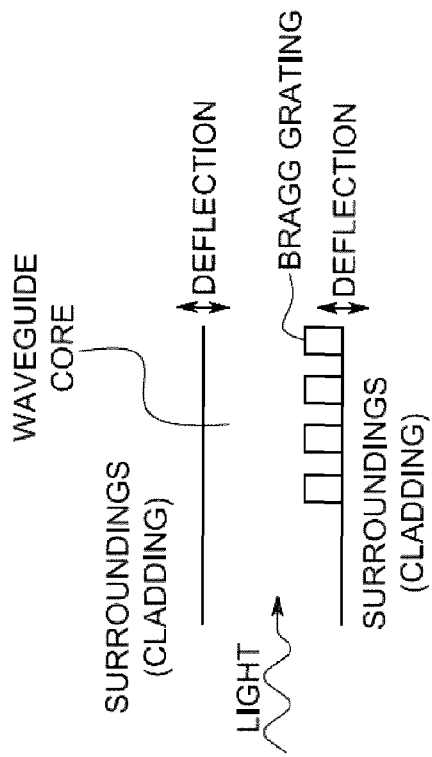
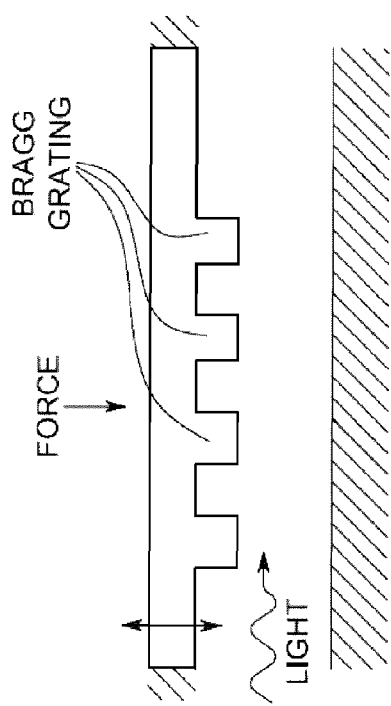
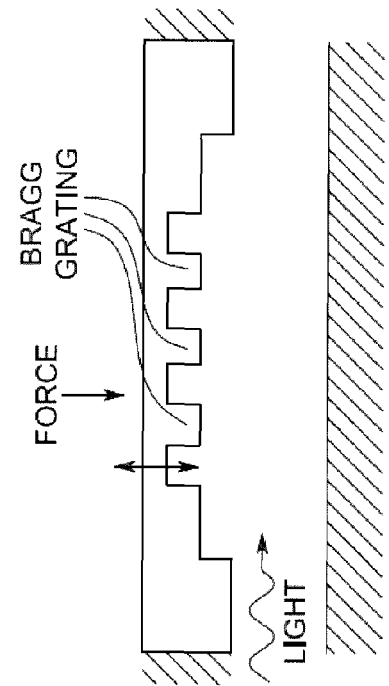
Fig. 4a
Fig. 4b
Fig. 4c
Fig. 4d

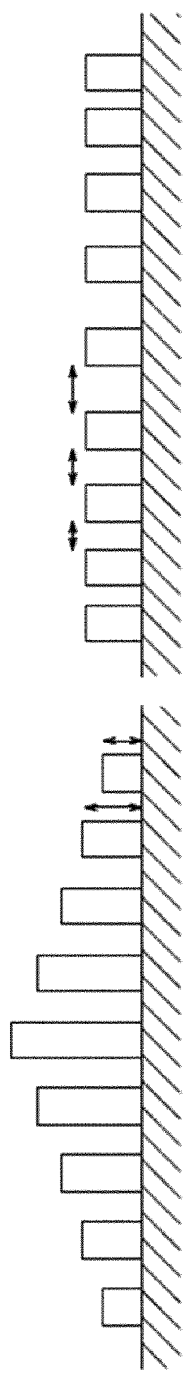
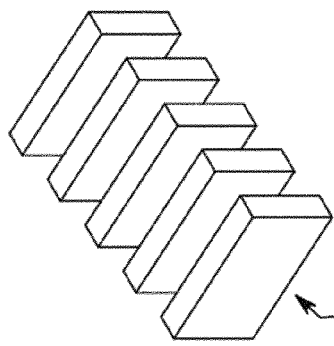
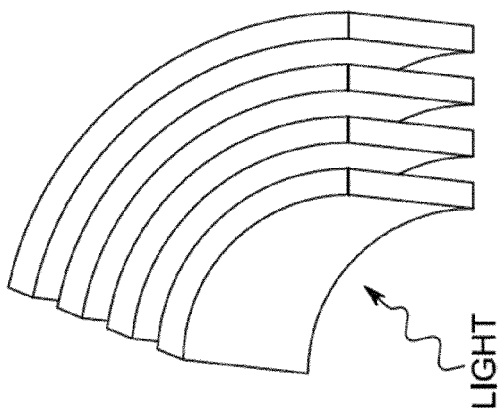
Fig. 5a
Fig. 5b
Fig. 5c
Fig. 5d

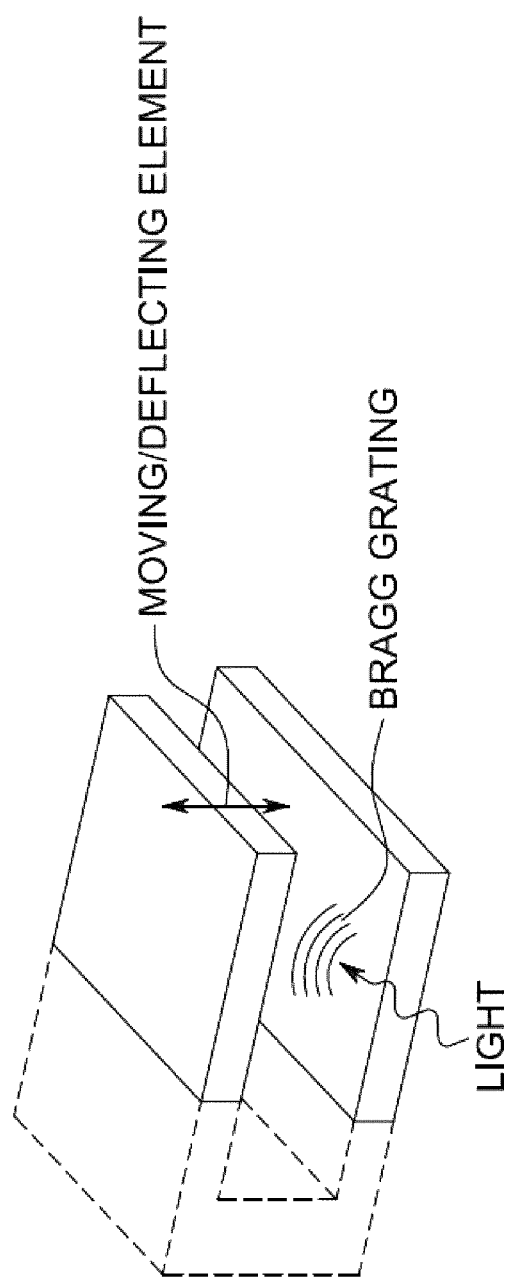

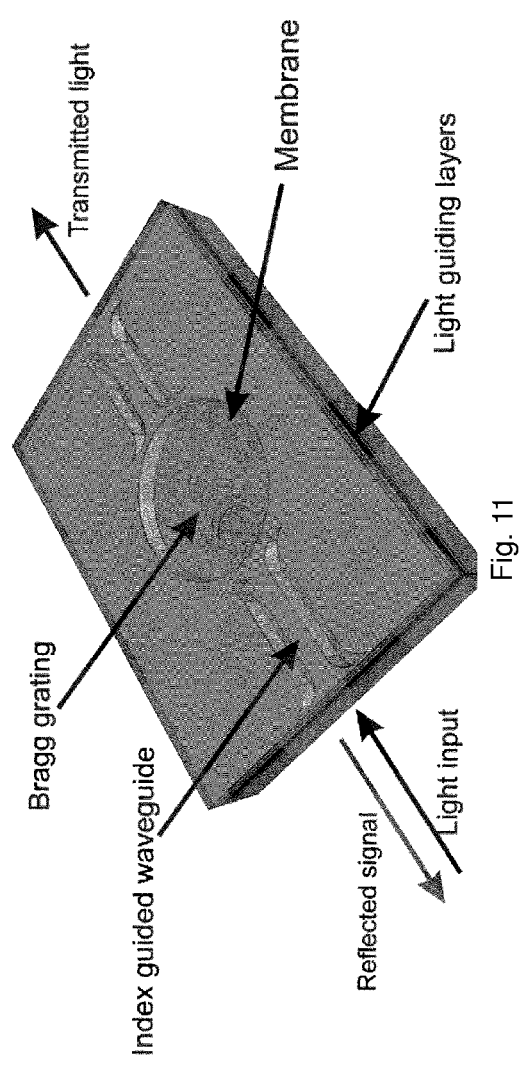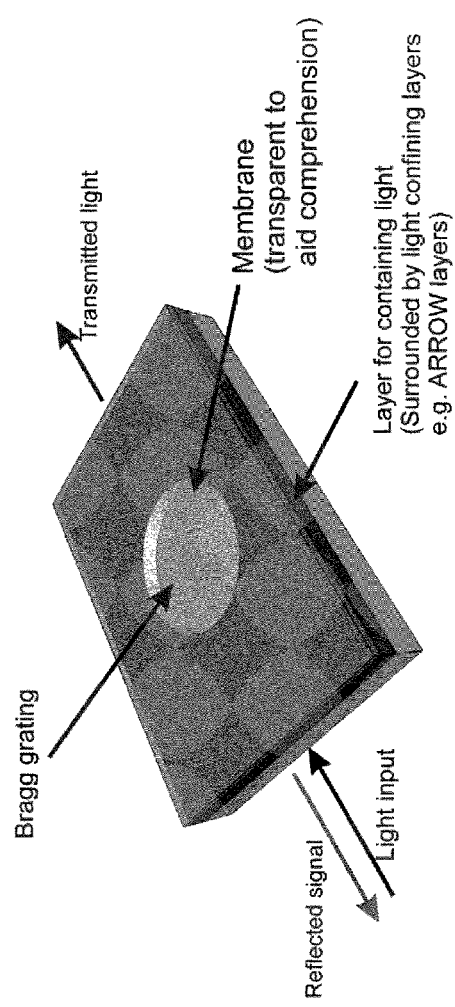
Fig. 11
Fig. 12

ALL-OPTICAL PRESSURE SENSOR

CROSS REFERENCE TO RELATED APPLICATIONS

This application is a national phase filing of, and claims priority to, PCT/EP2014/061625 filed on Jun. 4, 2014, which, claims priority to European Patent Application EP 13170867.9 filed Jun. 6, 2013 and European Patent Application EP 13196824.0 filed Dec. 12, 2013, the entire contents of each of which is hereby incorporated by reference herein.

TECHNICAL FIELD

The present invention relates to an all-optical pressure sensor comprising a waveguide accommodating a distributed Bragg reflector. Pressure sensing can then be provided by utilizing effective index modulation of the waveguide and detection of a wavelength shift of light reflected from the Bragg reflector. Sound sensing may also be provided thereby having an all-optical microphone.

BACKGROUND ART

A sensor is a device that detects a specific physical quantity belonging to the sensor environment, through the means of one or more detection mechanisms which converts the physical quantity to a sensor specific output signal. Well known examples of often used sensors include thermometers, speedometers, voltmeters, radars and seismometers. The vast majority of modern mechanical sensors are made using microelectromechanical system (MEMS) technology, as MEMS allows for small scale sensors and inexpensive mass production. With the development of MEMS technology and the advent of micro optical sensing technologies the expanded term microopto-electromechanical systems (MO-EMS) has become widely accepted. MOEMS allows for much more versatile sensor designs and detection of quantities in more difficult accessible environments than previous technologies.

All-optical sensors have a number of advantages that make them interesting for a broader range of applications, such as the low transmission loss in optical fibers which enables remote sensing. The sensing method of all-optical sensors can in general be divided into amplitude modulated (AM) and frequency modulated (FM) sensing. Frequency modulation refers to the fact that changes in wavelength of the reflected light are used for determining the physical quantity measured, rather than the amplitude of the reflected light as in amplitude modulation. While AM based sensors can achieve extremely high sensitivities due to the on/off characteristics of the signal, the signal is inherently vulnerable to transmission loss and noise and they are not easily integrated into larger sensor arrays since each sensor requires its own transmission line. On the other hand, FM based sensors do not have nearly the same sensitivity as AM based sensors, however, they are much more robust with respect to noise and are easily integrated into large distributed sensor systems as multiple sensors can share one transmission line. The dominating all-optical sensor today is the fiber Bragg grating (FBG) sensor based on frequency modulation and where the deformation of a Bragg grating is used for modulating the signal.

There are four major advantages of optical sensors: They exhibit immunity to electromagnetic interference, they are resistant to harsh environments, they simplify the process of measuring distributed physical quantities e.g. pressure, temperature and stress, and they are capable of multiplexing. However, compared to the vast number of electrical and opto-electrical sensors available today, all-optical sensors currently represent a small niche, since most all-optical sensors cannot in general compete with their electrical counterparts when it comes to sensitivity, dynamic range or price.

SUMMARY OF EMBODIMENTS

The present invention relates in general to an all-optical pressure sensor and in particular the present invention relates to an all-optical microphone. Sound is a mechanical wave that is an oscillation of pressure, or a sequence of waves of pressure, transmitted through a compressible medium such as solid, liquid, or gas, and composed of frequencies within the range of hearing. An audio microphone is a sound sensor and an audio microphone is therefore typically adapted to detect pressure waves in air. A microphone typically consists of a membrane (also referred to as "diaphragm" in microphone terminology) and a back chamber which is acoustically isolated from the surroundings in order to avoid acoustical short circuit. The provision of a back chamber is necessary for the functionality of a microphone, however in general not necessary for a pressure sensor.

All-optical microphones have been known for years. The present inventors have previously presented a highly sensitive all-optical microphone fabricated using MEMS technology. The sensing mechanism was based on modifying the effective refractive index of a hollow core anti-resonant reflecting optical waveguide (ARROW) incorporating a Bragg grating. By modifying the effective refractive index instead of the grating period a highly improved sensitivity was obtained. This all-optical microphone is described in detail in a Ph.D. Thesis from Kasper Reck: "MEMS Optical Sensor Systems" (2011) and in a Master's thesis from Christian Østergaard: "MEMS Optical Strain Sensors Based on Hollow Core Waveguides with Integrated Bragg Gratings" (2011). Details on the background theory, design and manufacturing details of optical sensor waveguides can be found in these publications, which are therefore incorporated by reference in their entirety.

In order to obtain the desired sensitivity of the pressure sensor for the all-optical microphone a highly sophisticated ARROW waveguide design was developed wherein the microphone back chamber was incorporated into the waveguide. However, even with MEMS technology these waveguide designs turned out to be difficult to realise in practise. In the pending patent application PCT/EP2013/061701 filed 6 Jun. 2013 and entitled "MEMS optical sensor" the present inventors abandoned the concept of an all-optical microphone and introduced optical sensors employing new and simpler waveguide designs in combination with higher order mode propagation and detection of the light thereby increasing the sensitivity of MEMS optical sensors. PCT/EP2013/061701 is hereby incorporated by reference in its entirety.

The simplistic waveguide designs disclosed in PCT/EP2013/061701 provide major advantages in the manufacturing process allowing for low cost production of hollow core optical waveguides. But these simple designs are not optimized for pressure sensing, and in particular not optimized for sound sensing. One purpose of the present invention is therefore to design an all-optical pressure sensor that can be realized in practise. A first aspect of the invention therefore relates to an optical pressure sensor comprising at least one outer membrane and a waveguide, the waveguide comprising at least one core for confining and guiding light, at least one distributed Bragg reflector located in said at least one core, and at least one inner deflecting element forming at least a part of the core, wherein the pressure sensor is configured such that the geometry and/or dimension of the at least one core is changed when the at least one outer membrane is submitted to pressure, such as a change or variation or oscillation of pressure or pressure waves.

A further embodiment relates to an optical pressure sensor comprising a housing, at least one outer membrane, and a waveguide attached inside the housing, the waveguide comprising at least one core for confining and guiding light, at least one distributed Bragg reflector located in said at least one core, and at least one inner deflecting element forming at least a part of the core, wherein the pressure sensor is configured such that said at least one inner deflecting element is connected to the at least one outer membrane such that the geometry and/or dimension of the at least one core is changed when the at least one outer membrane is submitted to pressure, or wherein the pressure sensor is configured such that a connection can be established between said at least one inner deflecting element and said at least one outer membrane such that the geometry and/or dimension of the at least one core is changed when the at least one outer membrane is submitted to a predefined level of pressure.

The inner deflecting element may be connected to the at least one outer membrane. However, the pressure sensor may be configured such that a connection can be established between said at least one inner deflecting element said at least one outer membrane. Possibly the pressure sensor is configured such that a connection can be established between said at least one inner deflecting element said at least one outer membrane at and above a predefined amount of pressure submitted to the outer membrane. I.e. the pressure sensor may be configured such that the geometry and/or dimension of the at least one core is changed when the at least one outer membrane at and above a predefined amount of pressure submitted to the outer membrane. Hence, the pressure sensor may be adapted such that there is a limit pressure, wherein no signal is provided from the sensor below this limit but signal is indeed provided above this pressure limit.

As a result of the change in core dimension and/or geometry the effective index of the core is changed. The inner deflecting element may take the form of a membrane thereby having two membranes, i.e. the inner and outer membranes. The pressure sensor may be a static pressure sensor. The invention further relates to an optical microphone comprising a back chamber, at least one outer membrane and a waveguide, the waveguide comprising at least one core for confining and guiding light, at least one distributed Bragg reflector located in said at least one core, and at least one inner deflecting element connected to the at least one outer membrane and forming at least a part of the core, wherein the microphone is configured such that the geometry and/or dimension of the at least one core is changed when the at least one outer membrane is submitted to sound. The waveguide may e.g. be attached inside the back chamber.

Pressure sensing (and thereby sound sensing in this microphone) can be provided by sending light into the waveguide core and utilizing effective index modulation of the waveguide by detecting the wavelength shift of light reflected from the Bragg reflector.

The sensing principle behind the presently claimed pressure sensor with refractive index modulation of a waveguide comprising a distributed Bragg reflector is therefore not new. But prior art optical MEMS microphones employed only one membrane, i.e. only one deflecting element. This membrane formed one side of the waveguide and was directly submitted to sound pressure when using the microphone. A key aspect of the present all-optical pressure sensor is the provision of an additional deflecting element—the outer membrane. The outer membrane is in contact with (or may be brought in contact with) the inner deflecting element, which forms one side of the waveguide (or at least a part of said side). In this new microphone design it is the outer membrane which is submitted to sound pressure. In the prior art optical MEMS microphones the single deflecting element had to meet a number of design constrictions for the microphone to function properly for pressure sensing. First of all the single deflecting element had to take the form of a membrane in order to detect pressure waves, in particular sound. Furthermore the back chamber had to be a part of the waveguide chip. By having two deflecting elements the degree of freedom in the pressure sensor design is greatly expanded. The inner deflecting element can be optimized to its function in the waveguide and the outer membrane can be optimized to its function as the receiver of pressure waves in the back chamber. With the advent of an outer membrane and a back chamber, possibly external to the waveguide, the back chamber spacing has been significantly increased compared to the prior art MEMS microphones. Increased back chamber spacing may improve the sensitivity and resolve noise issues, e.g. distortion, of the microphone. Microphone embodiments according to the present invention are disclosed in FIGS. 3a and 3b, where the connection between the two membranes is provided by a connecting rod.

A change in the geometry and/or dimension of the core is in most cases a consequence of a change in the geometry and/or dimension of the waveguide. E.g. the inner deflecting element forms part of the waveguide and when the inner deflecting element moves the geometry and/or dimension of the waveguide is changed. Thus, change in geometry and/or dimension of waveguide or core may be used interchangeably herein. The waveguides mentioned herein comprises one or more cores, typically one core. The confinement of light in a waveguide is typically provided in the core, thus propagation of light in a waveguide implicitly means that the light propagates in the core. Thus propagation of light in waveguide and core is used interchangeably herein. Inside the waveguide core the light may have a primary direction of propagation, typically along the longitudinal direction of the waveguide.

BRIEF DESCRIPTION OF THE DRAWINGS

The invention will now be described in further detail with reference to the drawings in which:

FIG. 1a illustrates the principle of a Fiber Bragg Grating (FBG),

FIG. 1b illustrates the principle of a Bragg grating in a hollow waveguide,

FIG. 1c shows the shift in Bragg wavelength as a result of the change in dimension of the waveguide core in FIG. 1b, FIG. 1d is a perspective illustration of a slab waveguide accommodating a Bragg grating in a hollow core, FIG. 2 show prior art MEMS optical microphones having only one membrane, FIG. 4a-b show normal and inverted grating designs, respectively, FIG. 4c shows an example of a corrugated deflecting element, FIG. 4d shows a cross-sectional view of the waveguide from FIG. 5e, FIG. 5a-d shows different exemplary grating designs, FIG. 6 shows a perspective of a simple slab waveguide with a grating and a deflecting element.

FIG. 11 is a perspective illustration of a waveguide chip where the coupling to the core is provided by means of index guided solid core waveguides.

FIG. 12 is a perspective illustration of a waveguide chip where the coupling to the core is provided by means of a solid light guiding layer.

DETAILED DESCRIPTION OF SPECIFIC EMBODIMENTS

Figure 2A:
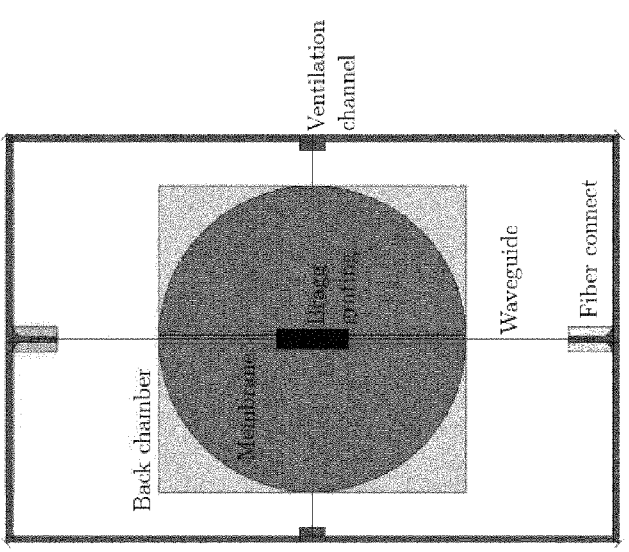

In the preferred embodiment of the invention the pressure sensor is all-optical i.e. light is the only physical parameter needed to detect pressure, such as pressure changes, such as sound, thus no electrical wires, magnetic fields or other means of detection or signal readout are necessary. Micro Electro-Mechanical Systems (MEMS) technology can be used to fabricate the waveguide for the present all-optical pressure sensor, thereby providing an optical pressure sensor based on MEMS. In most optical waveguides the light is confined inside a core with higher refractive index than the surrounding medium, called the cladding. This method of confining light is denoted total internal reflection. If the core has lower refractive index than the cladding, as for instance a hollow core waveguide, the waveguide is called a "leaky" waveguide.

The sensing principle of the present optical pressure sensor is preferably based on sensing a change in effective refractive index, rather than a change in Bragg period which is used in conventional FBG sensors for modulating the Bragg wavelength. The sensitivity of the basic sensing mechanism can be defined as the change in Bragg wavelength due to change in the effective index. It can be shown theoretically that the sensitivity only depends on the Bragg wavelength, the total height of the waveguide core and the refractive index of the core material.

When connected the outer membrane and inner deflecting element works together as a sort of transducer intended to faithfully inter-convert mechanical motion and change in pressure, e.g. due to sound. The varying air pressure of the pressure waves imparts vibrations onto the outer membrane which are then transferred to the inner deflecting element via the connection between them and thereby modulating the dimension and/or geometry of the waveguide core. Consequently the effective index of the waveguide is modulated by an oscillating pressure emanating on the outer membrane.

Consider two regions, one with only core material and one with both core and Bragg reflector material. In the region with only core material, the effective index is modulated simply by changing the waveguide core geometry. Low spatial confinement (equivalent to a large core) of the light will increase the effective index while high spatial confinement (equivalent to a small core) will decrease the effective index. In regions with both core and grating material two effects come into play; as before, the index will change in the core part due to higher or lower spatial confinement, but the effective index of the entire region will also depend on how large a fraction of the waveguide mode that is in the grating part of the region and how large a part that is in the core part. If the entire waveguide mode is in the core part, the situation is equivalent to the first case where there is no grating material. But if the mode overlaps an increasing part of the grating the effective index of the entire region will tend towards the effective index of the grating part. The effective index modulation can be along one or multiple axes.

The change of the waveguide core dimensions is limited by the compliance of the waveguide material. High compliance is obtained by using a non-solid core, e.g. a liquid filled core or a hollow core. However, the highest possible compliance is probably obtained by using a hollow core waveguide, i.e. a core substantially at least partly comprising a gas, such as air. Thus, in one embodiment of the invention the core is non-solid, preferably the core is hollow. Several hollow core waveguide designs are known in the art, including photonic crystal, distributed Bragg grating and anti-resonance reflecting optical waveguides (ARROWs).

A hollow core waveguide is easy to expand/compress as the compliance of the core is much higher than if the core is filled with a liquid or solid. A high compliance means high sensitivity to physical deformation forces. A solid core is simpler than a typical hollow core when it comes to fabrication and operation, as it can utilize total internal reflection for confining light. This is typically not possible for hollow core waveguides as the refractive index of gasses (e.g. air) is relatively low. Liquid core waveguides can have a higher or lower compliance than solid core waveguides and can utilize total internal reflection for confining light. Liquid core waveguides are beneficial if a substance, e.g. particles or DNA, is to be transported along the core. Examples of methods for confining light in a waveguide other than total internal reflection include photonic crystals, ARROWS, slot waveguides, metallic waveguides, distributed Bragg reflector waveguides and plasmon waveguides.

In the preferred embodiment of the invention the distributed Bragg reflector is located in the core of the waveguide.

Figure 2B:
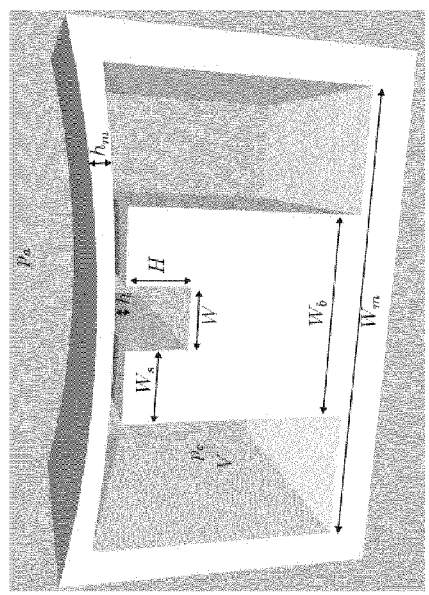
Figure 2C:
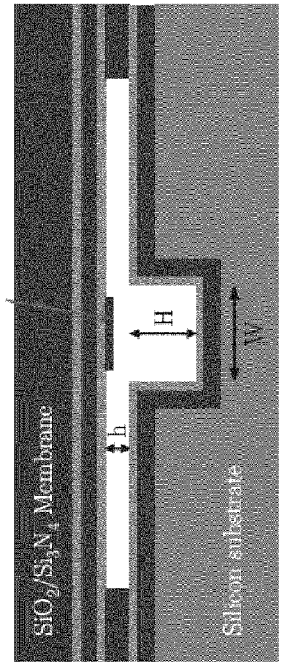
Figure 2D:
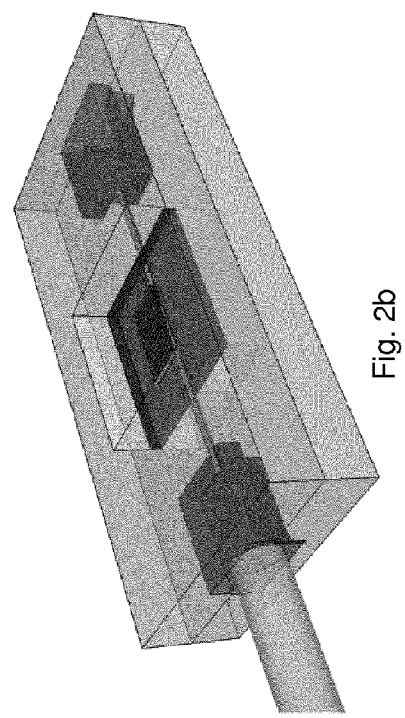

A prior art all-optical MEMS hollow core microphones, i.e. an example of a prior art optical pressure sensor, is illustrated in FIG. 2b-d with a perspective cross sectional view in FIG. 2b, a top view in FIG. 2c and a side cross sectional view in FIG. 2d. This prior art microphone consists of a bottom and a top wafer which is bonded together. On the bottom wafer is a rectangular ARROW waveguide which is connected to a fiber groove coupling in- and outlet in each end. Light is confined to the waveguide core due to the ARROW structure around it. However, for the ARROW sensor to work as a microphone it should have an air chamber, i.e. back chamber, below the membrane in order to compensate for the viscous losses in the system and contributions to the effective membrane stiffness. An air chamber is therefore placed on each side of the waveguide. On the top wafer a membrane is etched and a Bragg grating is placed centrally on this membrane. When the membrane deflects the dimensions of the ARROW core beneath it is modified. The top wafers comprise the fiber couplings. Light enters the microphone through an optical fiber which is connected to the waveguide through the couplings. Another prior art waveguide design for employment in a microphone is illustrated in FIG. 2a where the back chamber is part of the waveguide design. When light passes the membrane with the grating some of it will get reflected, as can be seen in the top of FIG. 1b which illustrates the sensing principle. The incoming light enters the waveguide from left to right and when it passes the Bragg grating some of the light is reflected from the grating and propagates from right to left in FIG. 1b. The membrane will deflect when a pressure is applied which changes the height of the waveguide from w1 to w2. This deflection changes the reflected wavelength as seen in the bottom of FIG. 1.b. By analyzing the reflected signal it is possible to determine the deflection of the membrane and hence the pressure. FIG. 1c shows how a signal may change when the reflected light changes (dashed line to solid line). The change in reflected wavelength can be seen as well.

The waveguide of the present optical pressure sensor may have a simple planar or strip geometry thereby greatly distinguishing the herein described optical pressure sensor from the prior art optical pressure sensors employing more complicated waveguide designs. As examples of simple designs the present waveguide may be having a solely planar geometry or a solely strip geometry. Further embodiments of the optical pressure sensor according to the invention may be provided with rib or multi-rib geometry waveguides.

When considering geometry and/or dimensional changes in the waveguide core, the terms geometry change and dimension change include a change in shape (e.g. from circular to rectangular) and scaling of a geometry (e.g. increasing the size of a rectangular geometry to e.g. twice its initial size).

The present waveguide can be e.g. a slab waveguide, a strip waveguide (such as a rectangular waveguide, a circular or half-circular waveguide) or a rib or multi-rib waveguide. The cross-section of the core may rectangular, polygonal or circular, half-circular, elliptical, half-elliptical or any combination thereof. Similarly the confinement of the core may be substantially rectangular, polygonal or circular, half-circular, elliptical, half-elliptical or any combination thereof.

The slab waveguide is simple to implement, but will only confine light in one direction, hence propagation and coupling losses (especially for the transmitted signal) could be large. Strip and rib waveguides confine light in two directions and will allow for lower coupling losses as light can be guided to a specific in/out-coupling point. This may be essential for multiplexing capabilities, where coupling losses should be minimized. Since a rib waveguide can be considered a combination of a slab and a rectangular waveguide, a high effective index modulation can be achieved as the mode is squeezed from the slab/rectangular part of the waveguide to the rectangular/slab part of the waveguide. This is due to the large difference in confinement (1 or 2 dimensional) between the two situations. Hence a larger effective index modulation is obtainable in e.g. rib waveguide geometries than in simple slab waveguide geometries.

In one embodiment of the invention the maximum width of the waveguide is at least 10 times the maximum height of the waveguide, or at least 20 times, or at least 30 times, or at least 40 times, or at least 50 times, or at least 60 times, or at least 70 times, or at least 80 times, or at least 90 times, or at least 100 times, or at least 500 times, or at least 1000 times, or at least 1500 times, or at least 2000 times, or at least 2500 times, or at least 3000 times, or at least 5000 times, or at least 10000 times, the maximum height of the waveguide.

The waveguide may be manufactured from two bonded substrates, such as silicon or pyrex or silica or fused silica substrates. Further, the waveguide core may be formed as a recess in a silicon substrate, such as a silicon or pyrex or silica or fused silica substrate. The substrates may be bonded by e.g. welding, e.g. laser welding, gluing, fusion bonding, anodic bonding or eutectic bonding to form a waveguide chip.

The waveguide, e.g. in the form of a waveguide chip, may be fabricated using MEMS technology. When dealing with optical propagation the most straightforward material to use is silicon. However, the waveguide (chip) may also at least partly be fabricated in metals, polymers, ceramics or any combination thereof, also including silicon.

Inner Deflecting Element and Outer Membrane

The sensing capabilities of the present microphone relate to the configuration of the inner deflecting element and the outer deflecting element, i.e. the outer membrane. The choice of material, as well as the geometry, thickness, and dimension of the deflecting elements, influences the functionality and characteristics of the pressure sensor, e.g. higher sensitivity can be obtained with soft materials, i.e. materials with a low Young's modulus, thus higher sensitivity when Young's modulus is lower. But the higher sensitivity will be obtained on account of a lower resonance, e.g. when the pressure sensor is a microphone. Thus, there is a trade-off between sensitivity and resonance when designing the deflecting elements.

The waveguide dimensions can be modulated by the inner deflecting element that either causes a change in the geometry of the waveguide core or modifies the material distribution around the core. It can also be induced directly by compressing/expanding the core. One or both of the deflecting elements may be formed as a cantilever, a beam, membrane, plate or similar deflectable construction. The shape of one or both of the deflecting elements can be circular, elliptical, polygonal or a combination. A cantilever design may be an advantage for the present optical pressure sensor because it allows for efficient ventilation of the waveguide. E.g. the inner deflecting element forms one side of the waveguide, but it is only attached on one side of the waveguide thereby forming a cantilever, like a springboard in a swimming pool. With a cantilever form the inner deflecting element is attached to the rest of the waveguide while still allowed to move. Ventilation of the waveguide may help to prevent viscous damping caused by air being compressed in the waveguide core upon downward movement of the inner deflecting element. This is mostly important for sound pressure applications with high frequency variation of the deflecting elements.

The inner deflecting element may be separated from the outer membrane, preferably by a predefined distance. Further, the inner deflecting element may be provided in a material different than the material of the outer membrane. Furthermore, the flexibility and/or rigidity of the inner deflecting element may be different from the flexibility and/or rigidity of the outer membrane, e.g. Young's modulus of the two may be different. E.g. if the thickness of the inner deflecting element is different from the thickness of the outer membrane. Thus, the thickness of the inner deflecting element may be less than the thickness of the outer membrane, such as less than 90%, less than 80%, less than 70%, less than 60%, less than 50%, less than 40%, less than 30%, less than 20%, less than 10%, less than 5%, less than 3%, less than 2%, or less than 1% of the thickness of the outer membrane. E.g. to sustain high pressures the outer membrane may be provided as a thick rigid plate compared to the inner deflecting element. Thus, the outer membrane may be more rigid than the inner deflecting element, e.g. rigid understood as less deflectable, e.g. higher Young's modulus of the outer membrane.

A deflecting element formed as a thin plate with a uniform thickness, such as a membrane, will typically deflect with the center of the plate having the largest deflection. Therefore, in a further embodiment of the invention the thickness of one or both of the deflecting elements is not constant. E.g. the thickness is varying across the length and/or the width of one or both of the deflecting elements. E.g. one or both of the deflecting elements may comprise one or more corrugations, e.g. in order to obtain a more uniform deflection at the grating location.

The inner and/or outer deflecting elements may for example be provided in metal, preferably a light weight metal such as aluminum or titanium, or in a metal alloy, or in plastic, ceramic or in soft materials like rubber. Thus, the deflecting element material may be selected from the group of: cellulose fiber, polypropylene (PP), polycarbonate (PC), Mylar (PET), silk, glassfibre, carbon fibre, titanium, aluminium, aluminium-magnesium alloy, nickel, and beryllium. The deflecting element(s) may be provided as a foil, e.g. a metal foil.

A protective cover, such as some sort of netting, may be provided to protect the outer membrane while allowing for pressure waves to penetrate the protective cover. The back chamber may be provided or formed in a casing or housing, preferably in a stiff lightweight material, e.g. metal such as aluminum or titanium, or a metal alloy, or a polymer.

Distributed Bragg Reflector

In the preferred embodiment of the invention the at least one distributed Bragg reflector is a grating. The height of the Bragg reflector affects the sensitivity of the optical pressure sensor. This is related to the effective index modulation which is partly due to changes in the mode/grating overlap. If the grating height is equal to or larger than the core height, there will be no change in the mode/grating overlap in the core as the core dimensions are modulated (the mode always overlaps the grating completely). Thus the effective index modulation due to change in mode overlap is neglectable. If the grating height is smaller than the full core height the effective index modulation due to core dimension modulation is no longer neglectable.

A given grating height will affect the different waveguide modes differently. This is due to the different spatial distributions of the waveguide modes. Thus, in one embodiment of the invention the maximum height of the distributed Bragg reflector is less than 50% of the maximum height of the waveguide core, or less than 40%, or less than 30% or less than 25%, or less than 20%, or less than 15%, or less than 10%, or less than 5% of the maximum height of the waveguide core.

If spatial confinement in the waveguide is increased (e.g. due to smaller waveguide dimensions), the effective index of an only-core region will decrease. However, in regions with both core material and grating material (where mode/grating overlap is relevant), the effective index might increase if the refractive index of the grating is larger than the refractive index of the core. This will happen when the decrease in effective index in the core region is smaller than the increase in effective index due to larger overlap between the mode and the high refractive index grating. In determining the optimum grating height the actual modes used for sensing should thus be taken into account. Since very high gratings will cause the reflection peak bandwidth to increase, and at the same time limit the motion of the deflecting element, typical grating heights are in the range of less than 25% of the full waveguide core height.

In one embodiment of the invention the least one distributed Bragg reflector is formed as a plurality of structures on a surface of the waveguide. These structures may be protrusions or recesses or a combination of both. The shape, height and period of the distributed Bragg Reflector might not be constant along the grating. Varying the height and shape of individual grating elements as well as the period can be used for creating specific reflection spectra. For low index modulations it is well known that the reflection spectrum is related to the spatial distribution of the grating refractive index by a Fourier transform (and the inverse Fourier transform). Thus, in one embodiment of the invention the height and/or width of said structures are varying periodically. Further, the distance between said structures may be varying periodically. Furthermore, the structures may be straight or curved, such as sinusoidal curved or curved as an arc or curved as a parabola. One design could use an apodized Bragg reflector in order to e.g. suppress side lobes. Another possibility is to use a chirped Bragg reflector.

Figures 10A, 10B:
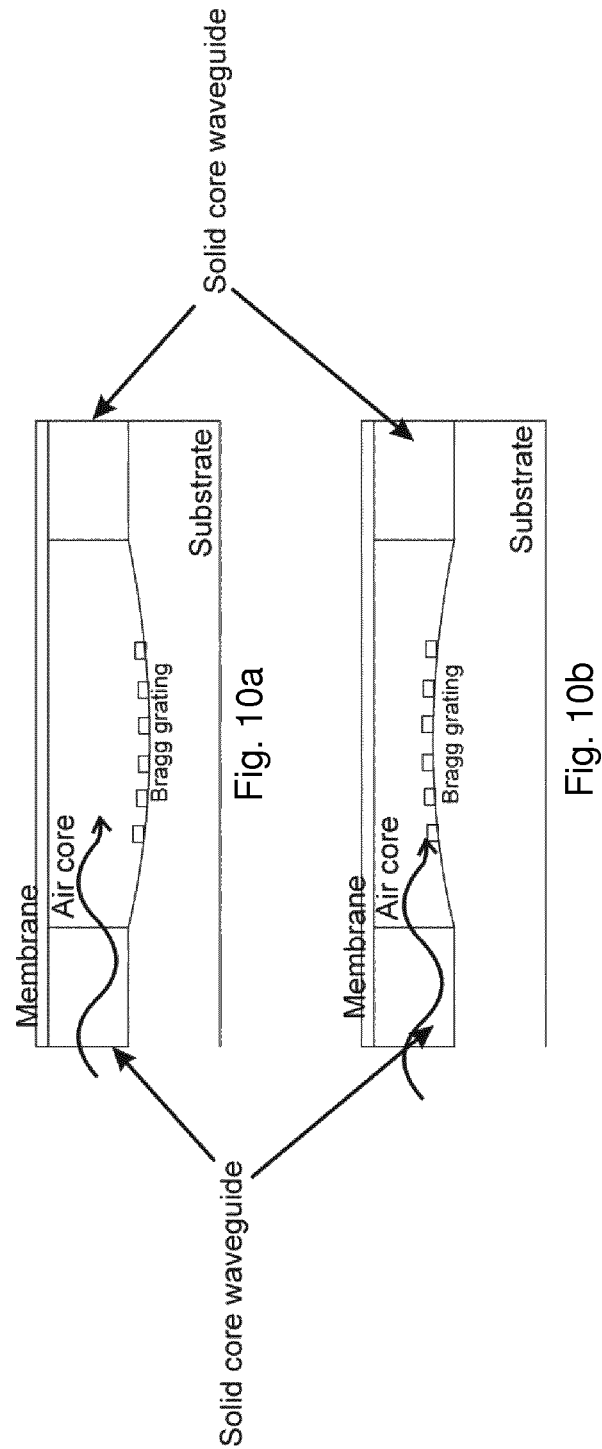
FIG. 10a-b show apodized gratings obtained by means of curved bottom surfaces of the waveguide.

Apodization can also be obtained by arranging the distributed Bragg reflector on a non-plane surface. E.g. the bottom surface of the waveguide core may be convex, i.e. curving outwards (FIG. 10a), or concave, i.e. curving inwards (FIG. 10b). Thus, the protrusions of a Bragg grating may be of equal height but when distributed on a curving surface the result is a Bragg grating with a height varying along the length of the waveguide core, i.e. in the direction of propagation of the light, whereby the refractive index is varying along the length of the waveguide core. Examples are illustrated in FIG. 10.

In one embodiment of the invention the pressure sensor comprises two or more distributed Bragg reflectors. These distributed Bragg reflectors may be identical or different. An optical pressure sensor comprising two different Bragg reflectors may be utilized for sensing of different "events" as the reflections from each Bragg reflector typically will be distinguishable.

There are numerous possibilities for placing the Bragg reflector(s) in the waveguide. A distributed Bragg reflector can e.g. be located on the inner deflecting element. Another possibility is that a distributed Bragg reflector is located on a surface of the waveguide opposite the inner deflecting element.

Connection Between Inner Deflecting Element and Outer Membrane

The connection between the inner deflecting element and the outer membrane is important for the functionality of the present optical pressure sensor. The connection may be provided by means of at least one connecting rod, such as more than one connecting rod. The rod may be rigid such that pressure waves imminent on the outer membrane are directly "transmitted" to the inner deflecting element. Thus, preferably the connecting rod has a low weight, and preferably the connecting rod is made in a rigid light weight material, such as metal, such as aluminium or titanium, or a polymer, such as plastic, or a carbon composite material. The connecting rod may be hollow, such as a hollow tube, to reduce the weight of the rod. If the goal is to reduce the weight of the rod, the length of the rod should preferably be as short as practically possible, e.g. for the given design of the optical microphone, as this will help to reduce the weight of the rod. However, a longer rod may also be an advantage because a longer rod can be designed to bend at high pressure, e.g. in order to protect the waveguide from harm. In order to distribute the force transfer between the connecting rod and the deflecting elements, the interface between the connecting rod and the inner deflecting element and/or the outer membrane may be larger than the cross-sectional area of the rod, i.e. the rod may be provided with a base in one or both ends. In some cases it may be an advantage that the connecting rod is flexible and/or bendable. In these cases the connecting rod may have the function of a frequency filter, e.g. a low-pass filter, a high-pass filter or a band-pass filter. This may be provided if the connecting rod is flexible, elastic, e.g. in the form of non-linear elasticity, and/or viscoelastic. The connecting rod is typically attached to one or both the deflecting elements, e.g. by gluing or welding. The connecting rod may also be attached to one or both of the deflecting elements through a hole or aperture in said membrane.

Solid Ridge in Core

In a further embodiment of the herein disclosed pressure sensor, the waveguide core comprises a least one solid ridge extending in the direction of the propagation of the light. The solid ridge(s) is preferably provided in a light guiding material. The solid ridge(s) may be provided to reduce the loss in the waveguide and/or increase the sensitivity of the pressure sensor. This may be provided because the optical pressure sensor and/or solid ridge(s) can be configured such that light propagating in the waveguide core is confined within and around said solid ridge(s). If the solid ridge is provided in a light guiding material, light propagating in the core will tend to be in and around the ridge, i.e. the light will be overlapping with the ridge, e.g. an evanescent field will be generated around the ridge. Examples of solid ridges are illustrated in FIGS. 13-16.

Figure 15A:
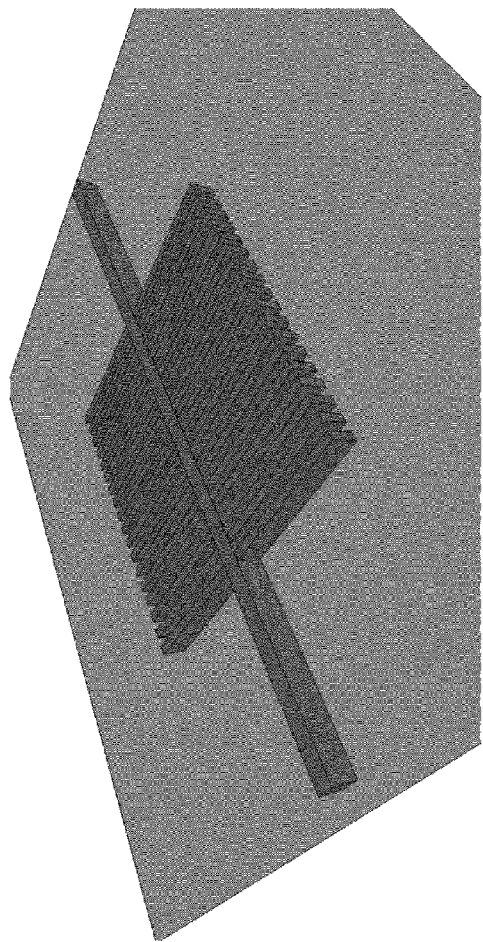
Figure 15B:
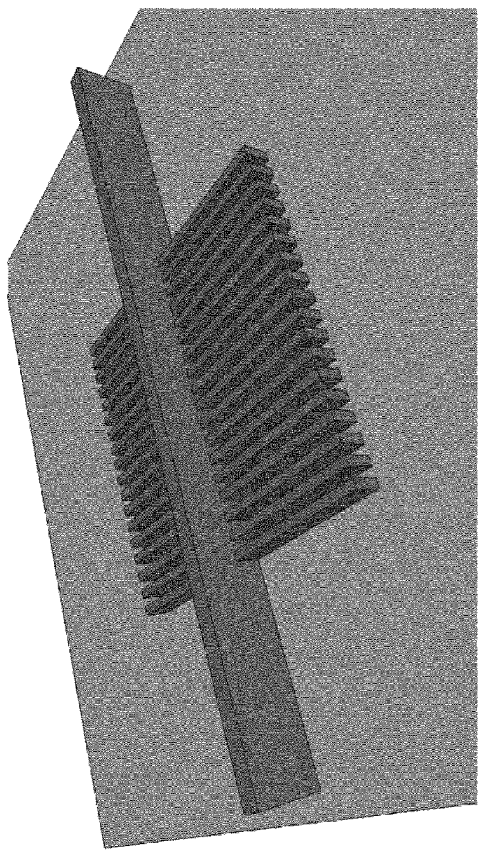
Figure 16:
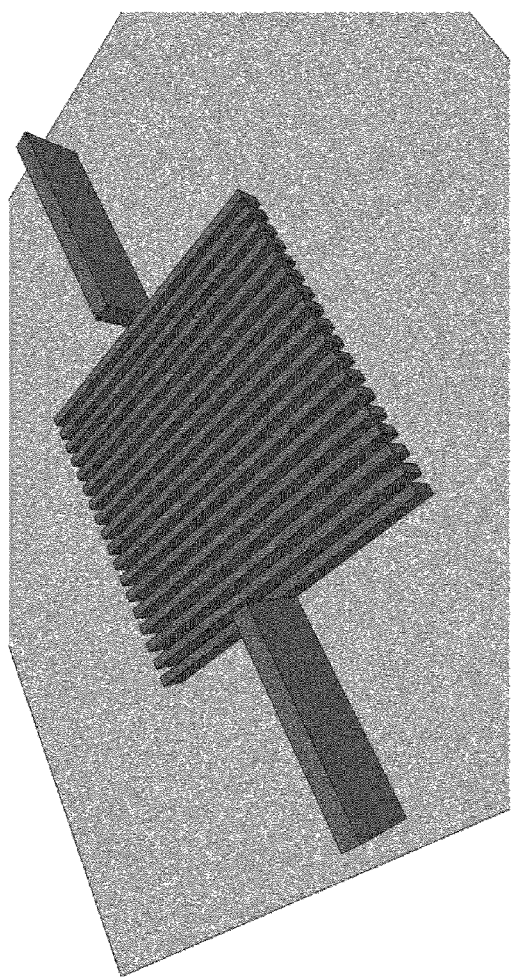

In a further embodiment the solid ridge(s) is located centrally in the waveguide core, as e.g. illustrated in FIG. 13-16. A central ridge may help to confine the light to a central part of the waveguide core. As also illustrated in FIGS. 13-16 the solid ridge(s) may be provided as one or more straight solid ridges. E.g. as illustrated in FIGS. 13a and 16 showing two straight solid ridges, where one solid ridge is abutting the distributed Bragg deflector(s) at each side of said distributed Bragg deflector(s).

Figure 13A:
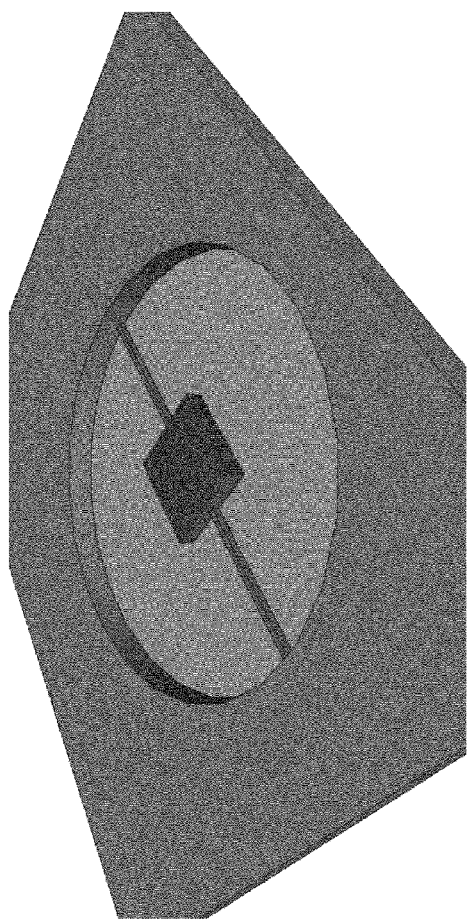
FIG. 13a-b are perspective illustrations of waveguide cores with a Bragg grating and a central solid ridge extending in the direction of the propagation of the light. The ridge is located either on the same plane as the bragg grating or on the opposite plane (the membrane) or on both.
Figure 13B:
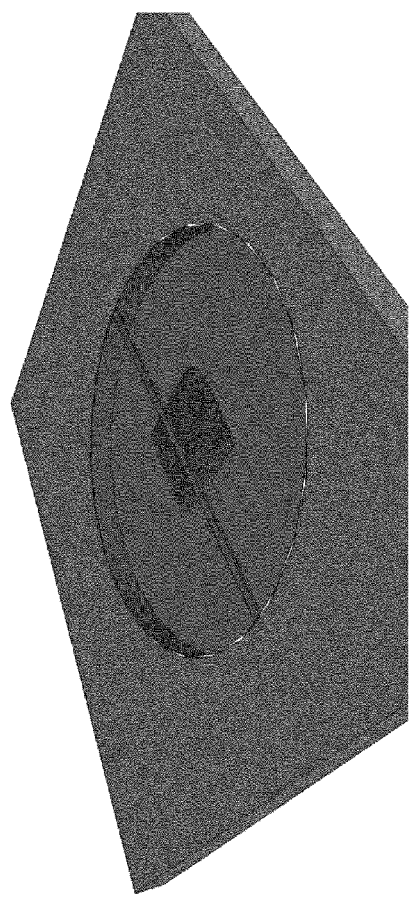
Figure 14A:
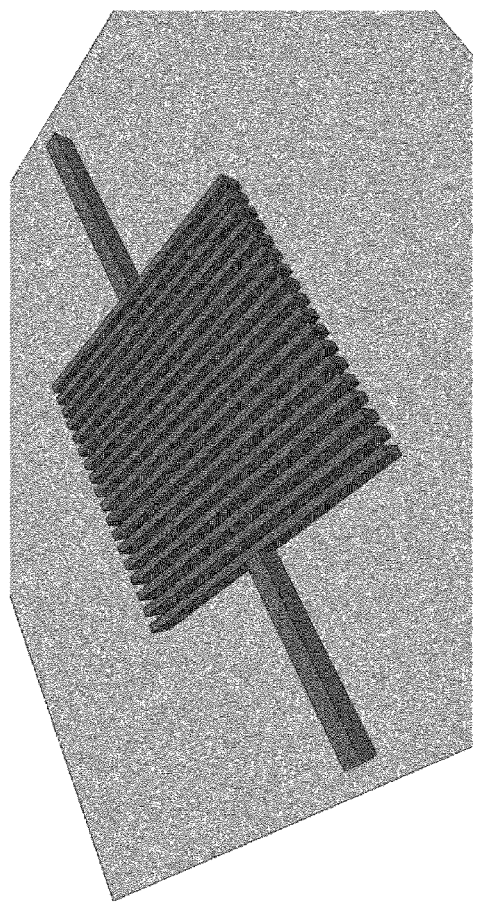
FIGS. 14-16 are exemplary close-up illustrations of various embodiments of a waveguide core with a Bragg grating and solid ridge.
Figure 14B:
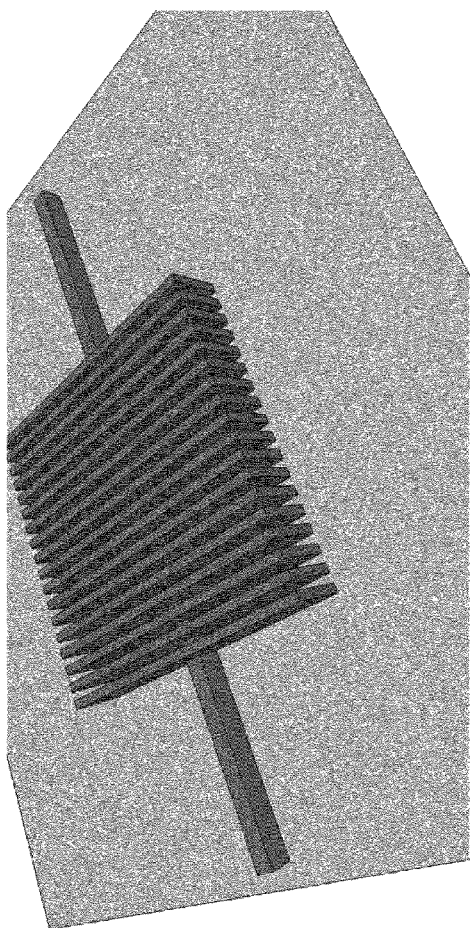

The solid ridge(s) may be extending the length of the core above the distributed Bragg deflector(s), as e.g. illustrated in FIG. 13b. The solid ridge(s) may alternatively be extending the length of the core through the distributed Bragg deflector(s), e.g. as illustrated in FIGS. 14b, 15a and 15b. The height of the solid ridge(s) may be less than or equal to the height of the distributed Bragg deflector(s), e.g. as shown in FIGS. 13a, 14a, 14b and 15a. Alternatively the height of the solid ridge(s) may be greater than the height of the distributed Bragg deflector(s), e.g. as shown in FIGS. 15b and 16.

As illustrated in FIGS. 11-13 the width of the solid ridge(s) may be less than or equal to the width of the distributed Bragg deflector(s). Alternatively the width of the solid ridge(s) may be greater than the width of the distributed Bragg deflector(s).

In a further embodiment the maximum height of the solid ridge(s) is less than 50% of the maximum height of the waveguide core, or less than 40%, or less than 30% or less than 25%, or less than 20%, or less than 15%, or less than 10%, or less than 5% of the maximum height of the waveguide core.

In a further embodiment the maximum width of the solid ridge(s) is less than 50% of the maximum width of the waveguide core, or less than 40%, or less than 30% or less than 25%, or less than 20%, or less than 15%, or less than 10%, or less than 5%, or less than 3%, or less than 2%, or less than 1% of the maximum width of the waveguide core.

In a further embodiment the maximum height of the solid ridge(s) is less than 90% of the maximum height of the distributed Bragg reflector, or less than 80%, or less than 70%, or less than 60%, or less than 50%, or less than 40%, or less than 40%, or less than 30% or less than 25%, or less than 20%, or less than 15%, or less than 10%, or less than 5% of the maximum height of the distributed Bragg reflector.

In a further embodiment the maximum height of the solid ridge(s) is at least 105% of the maximum height of the distributed Bragg reflector, or greater than 110%, or greater than 120%, or greater than 130%, or greater than 140%, or greater than 150%, or greater than 200%, or greater than 250%, or greater than 300%, or greater than 400%, or greater than 500% of the maximum height of the distributed Bragg reflector.

In a further embodiment the maximum width of the solid ridge(s) is less than 90% of the maximum width of the distributed Bragg reflector, or less than 80%, or less than 70%, or less than 60%, or less than 50%, or less than 40%, or less than 40%, or less than 30% or less than 25%, or less than 20%, or less than 15%, or less than 10%, or less than 5% of the maximum width of the distributed Bragg reflector.

Housing

The pressure sensor may be provided in a housing, e.g. for protecting the waveguide. The presently disclosed optical pressure sensor may be designed and used for measuring pressures of several thousand bars (e.g. in oil wells) and it may be used for sensing sound pressure, which may correspond to $10^{-3}$ bar or even $10^{-6}$ bar. Frequency wise it may be adapted for almost constant pressure, i.e. pressure variation at low frequencies, up to pressure variation frequencies in the kHz or MHz range. The adaptation of the pressure sensor to the different applications is to a certain degree determined by the properties and dimension of the waveguide. However, the large range in applications of the presently disclosed is mainly due to the type of housing that is used for the pressure sensor. The waveguide may be configured to provide for variations of the inner membrane on the order of nanometers, maybe up to micrometers. The housing and the outer membrane can then be configured to provide for these specific variations/tolerances of the inner membrane, by selecting dimensions, materials and thickness of the housing, the outer membrane and the connection between the inner and outer membranes. I.e. for a pressure sensor configured to measure and sustain high pressures of tens, hundreds or thousands bars the housing may be provided in a robust design, e.g. in stainless steel (or similar) with an outer surface thickness of several mm, e.g. 4-6 mm, and a thickness of the (stainless steel) outer membrane on the order of 0.4-1 mm. Whereas for a microphone (as shown in example 1) the outer membrane may be very thin metal foil such that small sound pressure differences can be detected.

FIGS. 17-21 illustrate different embodiments of housing solutions for the presently disclosed pressure sensor. Thus, the herein disclosed pressure sensor may comprise a housing wherein the waveguide is incorporated. The housing may have a surface incorporating the outer membrane. The housing may be provided in a stiff lightweight material, e.g. metal such as aluminum or titanium, or a metal alloy, stainless steel, a ceramic material, aluminum oxide, or a polymer.

In one embodiment the outer membrane and/or the connection between the outer membrane and the inner membrane is incorporated in one surface of the housing. The outer membrane may be part of one surface of the housing, e.g. the outer membrane and/or the connection between the outer membrane and the inner membrane may be provided as one or more recesses in one surface of the housing. The waveguide is preferably attached to a surface of the housing incorporating the outer membrane. The waveguide may be attached to an inner surface of the housing and where at least a part of said inner surface is polished.

Figure 17:
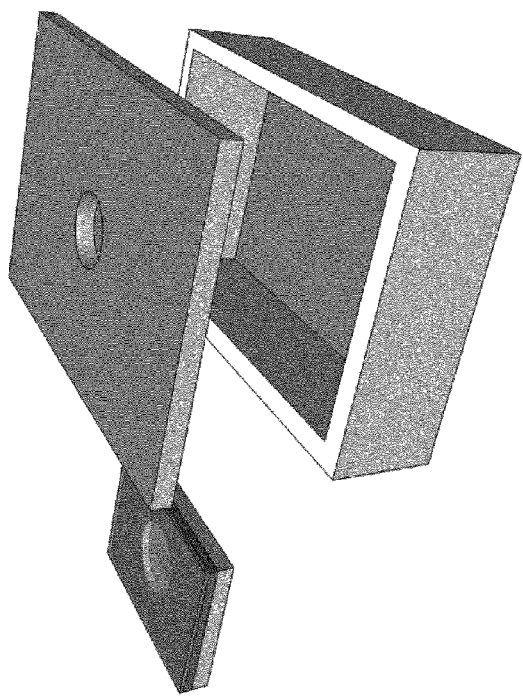
FIG. 17 shows a possible assembly of one embodiment of the herein disclosed pressure sensor comprising a waveguide chip to be incorporated in a housing where the outer membrane is incorporated in the lid of the housing.

Different housing solutions are illustrated in FIGS. 17-21. A simple casing is illustrated in FIG. 17 with a top surface (lid) incorporating the outer membrane formed as a circular recess in the surface. The waveguide is attached to the inner surface of the lid such that the inner membrane of the waveguide abuts the top inner surface of the lid as illustrated in FIGS. 18a and 18b. In FIG. 18a the outer surface of the lid is visible showing the circular recess. The inner surface of the lid is shown in FIG. 18b where the inner/lower surface of the circular outer membrane is marked, the shape of the outer membrane may be adapted to the circular shape of the inner membrane of the waveguide chip.

Figure 18A:
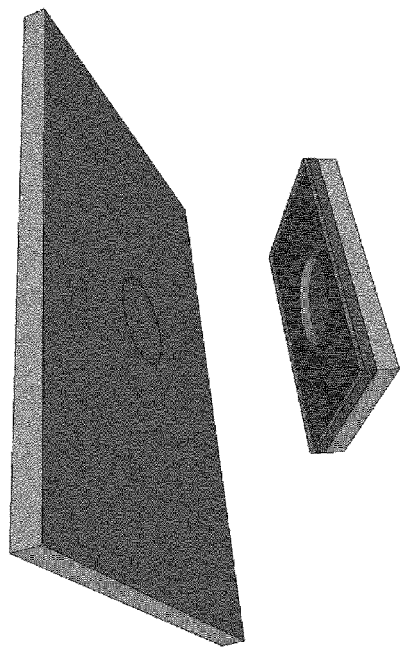
FIG. 18a-d show exemplary perspective illustrations of a waveguide chip to be attached to a top surface, e.g. of a housing, incorporating an outer membrane.
Figure 18B:
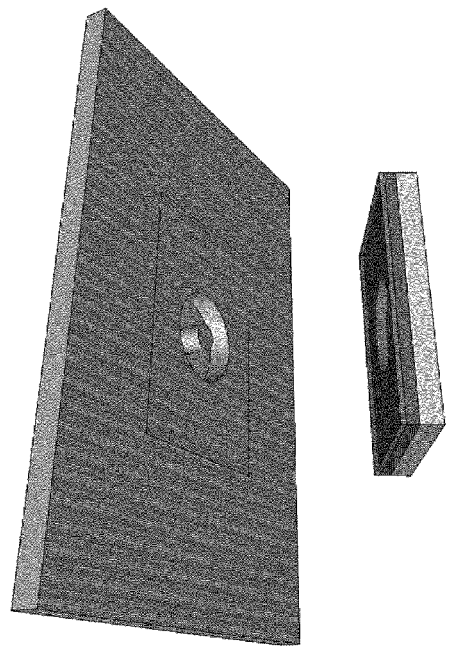
Figure 18C:
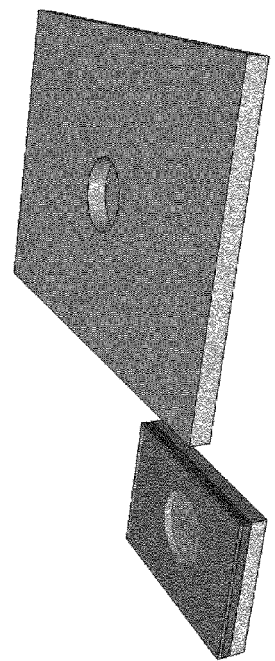
Figure 18D:
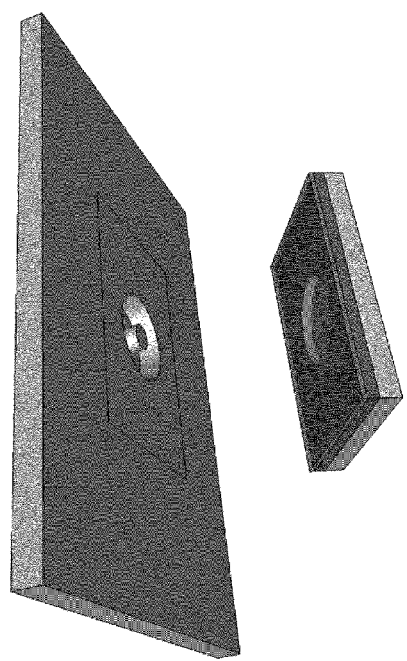

Another solution is illustrated in FIG. 18c showing a waveguide chip and the inner surface of a lid where the outskirts of the waveguide is marked as a rectangle and where the outer membrane is formed as a recess from the inner surface of the lid, thereby possibly providing for a plane and smooth outer surface of the housing. The outer membrane is thus part of the outer surface of the lid and the connection between the inner membrane of the waveguide chip and the outer membrane is provided by a connecting rod/pylon which is formed directly as part of the recess in the housing surface/lid. FIG. 18d corresponds to FIG. 18c, however the inner surface of the housing surface/lid is polished to provide for a completely plane surface to connect with the waveguide chip.

Figure 19A:
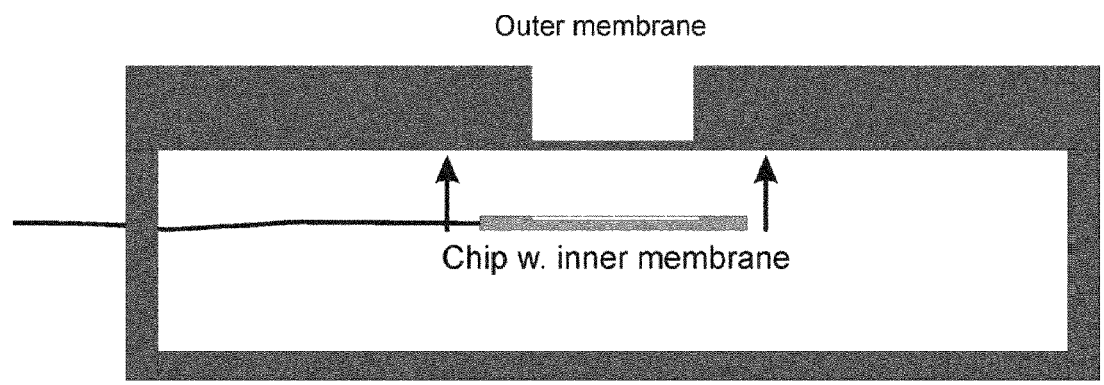
FIG. 19a-c shows cross-sectional illustrations of various embodiments of the herein disclosed pressure sensor where a waveguide chip is attached to the top inner surface of a housing and where the outer membrane is incorporated in the top surface.

FIG. 19a shows a cross-section of a housing where a waveguide chip is about to be attached to the inner top surface of the housing. The outer membrane is formed as a recess in the housing surface and the waveguide chip is mounted directly under the outer membrane such that the inner and outer membrane abuts each other. In FIG. 19c a "pressure" is illustrated submitted to the outer membrane providing a deflection which is delivered to the inner membrane which can be detected as a change in the reflected optical signal via the optical guide connecting the waveguide chip out to the left of the housing.

Figure 20A:
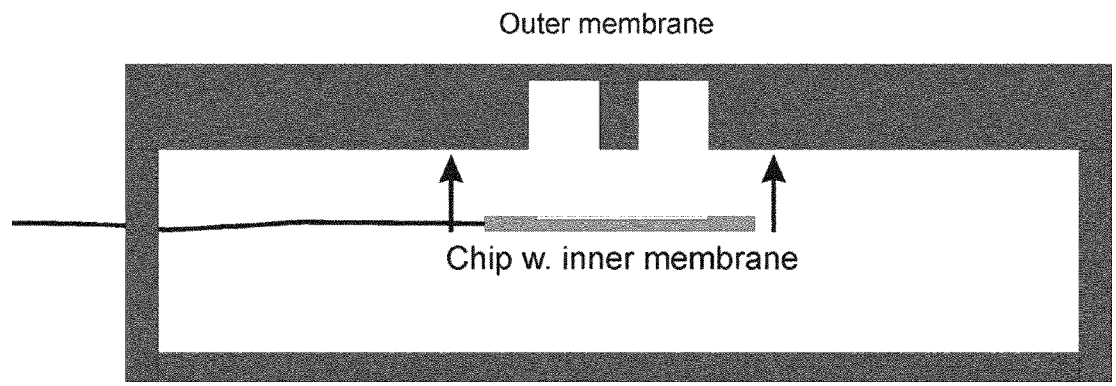
FIG. 20a-c is like FIG. 19 with a different embodiment of the outer membrane and the connection between the inner and outer membranes.
Figure 20B:
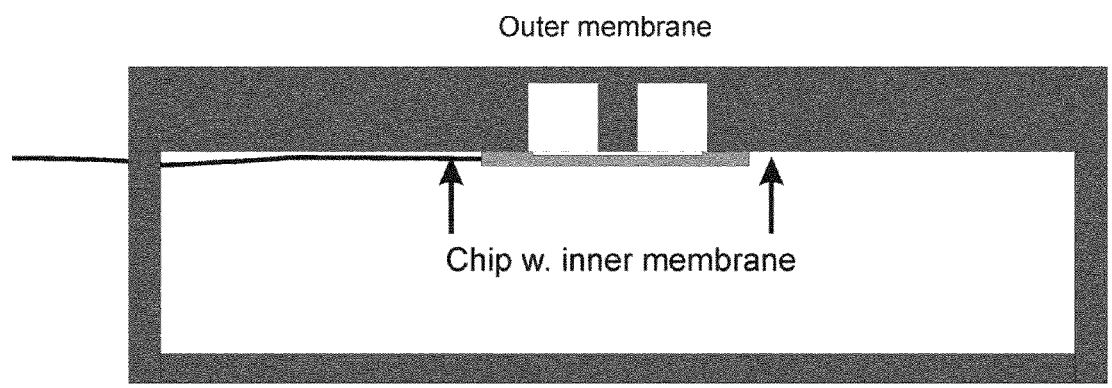
Figure 20C:
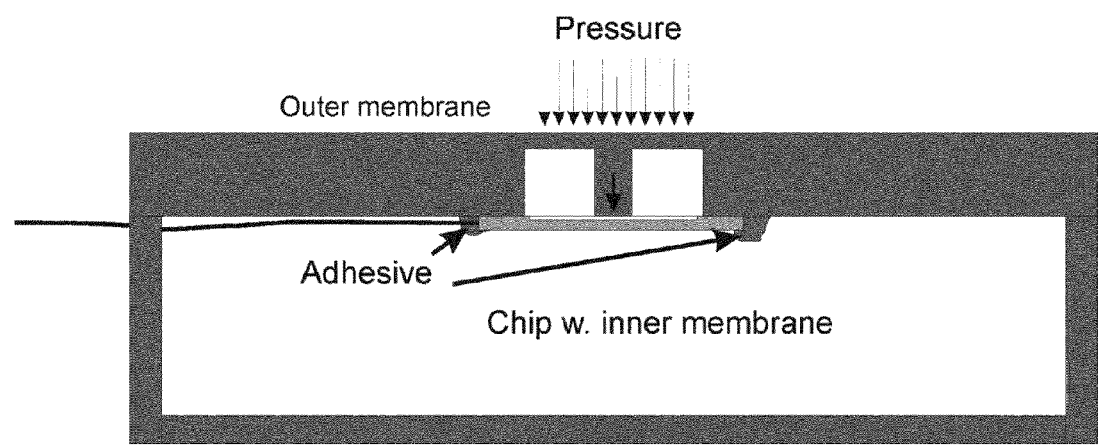
Figure 22A:
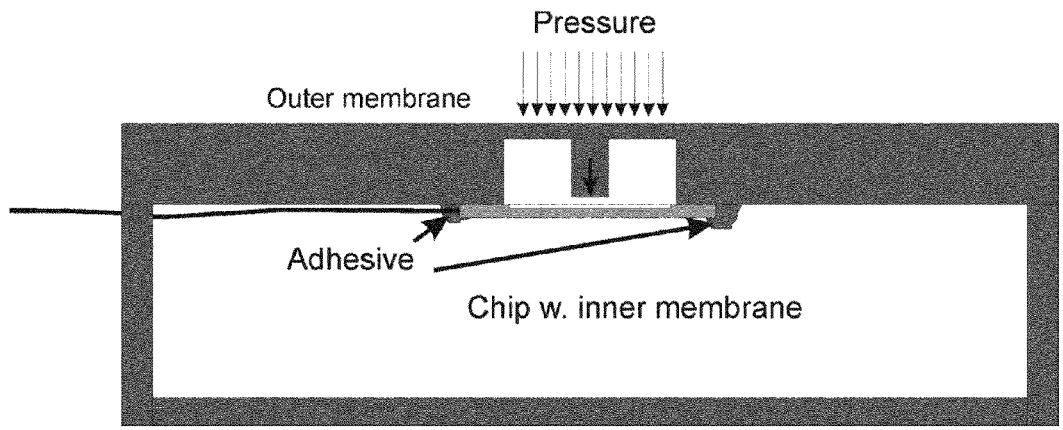
FIG. 22a is like FIG. 20c, however with a slightly reduced height of the pylon connection between the inner and outer membrane.

A corresponding solution is illustrated in FIG. 20 where the outer membrane is formed as a recess from the inner surface of the housing, such that the outer surface of the housing is plane. The connection between the inner and outer membrane is provided by a connecting rod/pylon which is formed as part of the recess. FIG. 20c illustrates that the waveguide chip can be attached to the housing surface by means of adhesive. The rest of the housing (i.e. the "void" space) is merely to protect the waveguide/chip and it can be made smaller, e.g. reducing the void volume. The connecting rod/pillar/pylon may be reduced in height as illustrated in FIG. 22a, where there is a gap between the connecting rod and the inner deflecting element of the waveguide. I.e. during steady state condition in low pressure and low pressure variations there is no detection in the waveguide. Thus, reducing the height of the connecting rod enables the possibility of targeting a desirable dynamic range for the sensor. Reducing the height of the connecting rod/pillar will shift the lower limit of the sensor's range up to higher pressures, i.e. a higher limit, since small deflections of the outer membrane will no longer be detected by the waveguide containing the inner membrane. A detection of a pressure by the waveguide chip will only be made when the rod/pillar on the outer membrane touches the inner membrane and deflects it, i.e. at and above a certain predefined pressure applied to the outer membrane. This may be advantageous when the pressure sensor is employed under constant high pressure and only variations in this high pressure may then be detected.

Figure 19B:
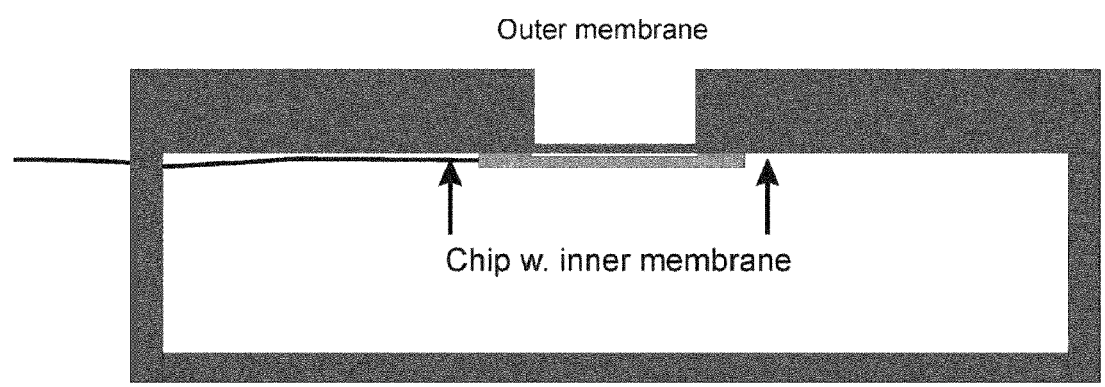
Figure 19C:
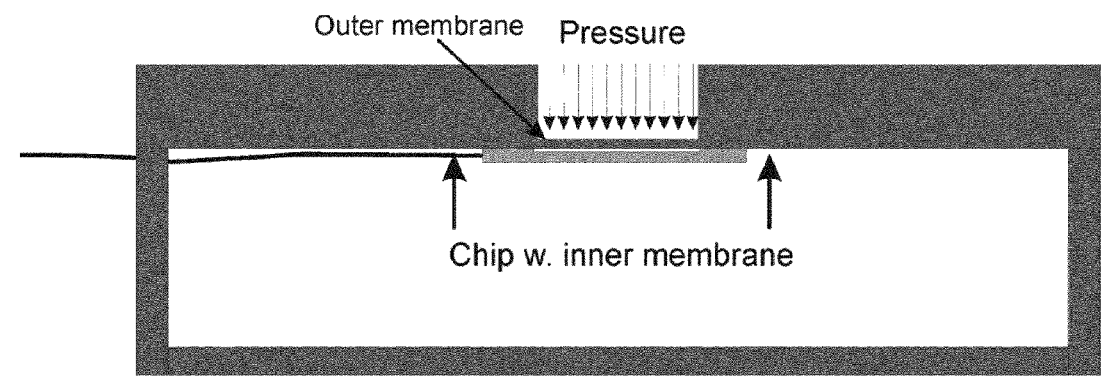
Figure 21A:
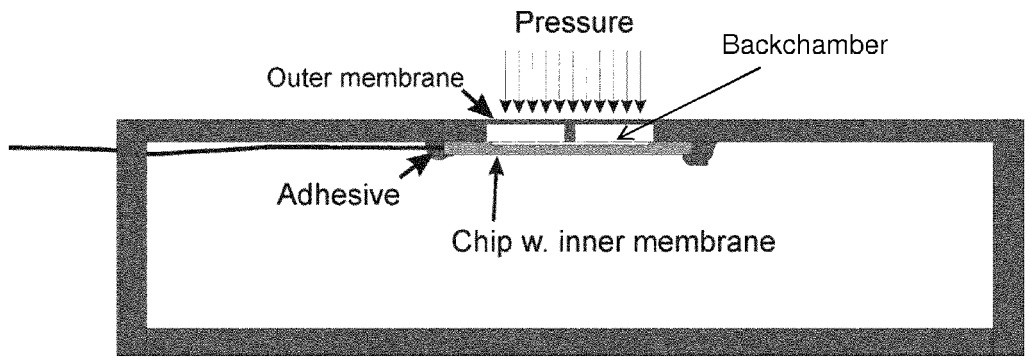
FIG. 21a-c is like FIGS. 19 and 20, however with a reduced thickness of the outer membrane and different provisions of a back chamber thereby making the pressure sensor suitable for sound pressure measurement, i.e. a microphone.
Figure 21B:
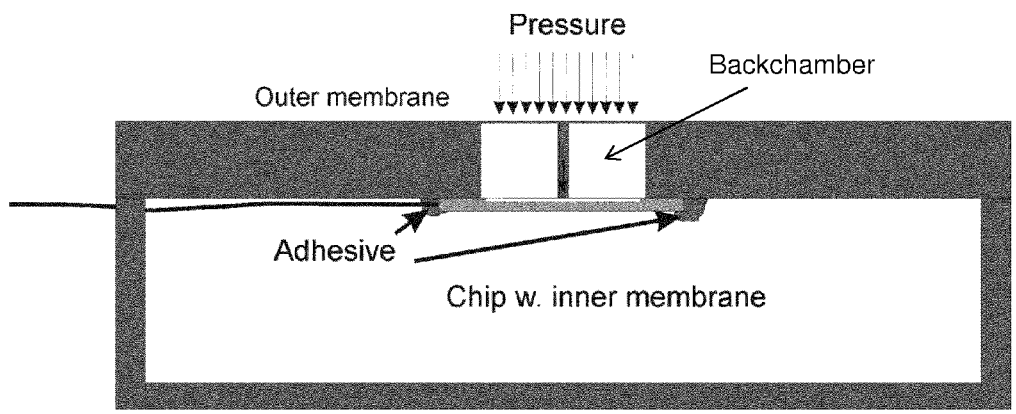
Figure 21C:
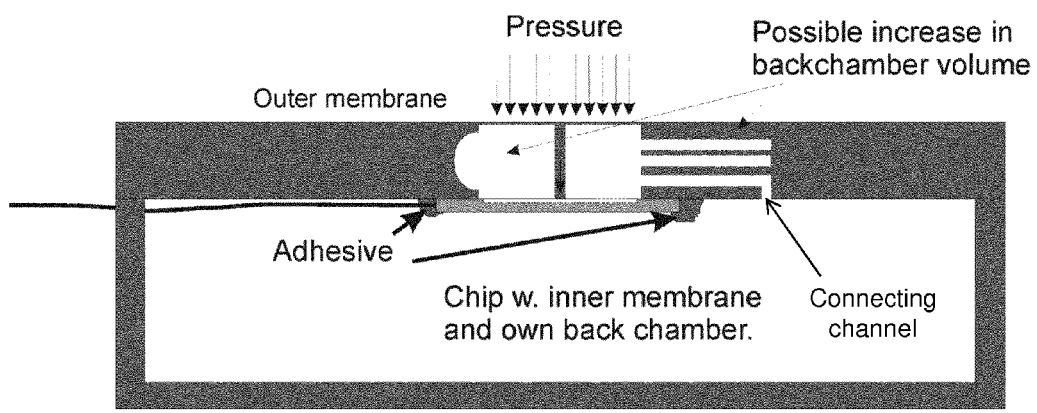

FIG. 21 corresponds to FIGS. 19 and 20, however configured for much lower pressures. The waveguide chip is the same in FIGS. 19-21, but the thickness of the outer membrane is much lower in FIG. 21. Also the thickness of the connecting rod is lower in FIG. 21. In FIG. 21a the thickness of the upper housing surface is also lower than what is seen in FIGS. 19 and 20. The reduced thickness of the outer membrane makes the outer membrane less rigid, i.e. it deflects easier for a specific pressure, thereby being more pressure sensitive. A back chamber is also provided in FIG. 21, thereby making the pressure sensor in FIG. 21 suitable as a microphone. The back chamber is provided as the volume between the outer and inner membrane, i.e. the back chamber is located and/or incorporated in a wall of the housing. In FIG. 21*c* it is illustrated that the volume of the back chamber can be increased by further recessions in the wall of the housing. A connecting channel is also provided from the volume under the outer membrane to the bigger volume of the housing, such that this bigger volume can function as part of the back chamber.

Figure 22B:
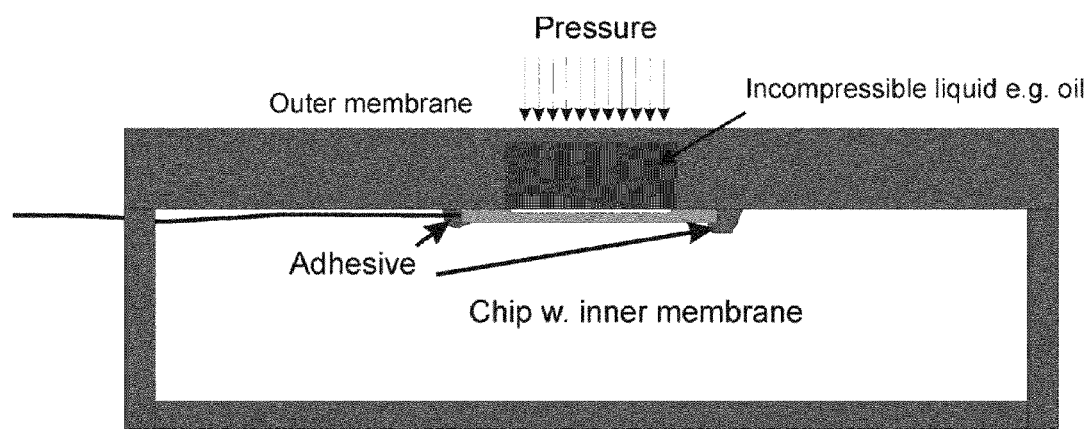
FIG. 22b is like FIGS. 19 and 20 with a different embodiment of the connection between the outer and inner membrane, in this case the connection is provided by an incompressible fluid.
Figure 22C:
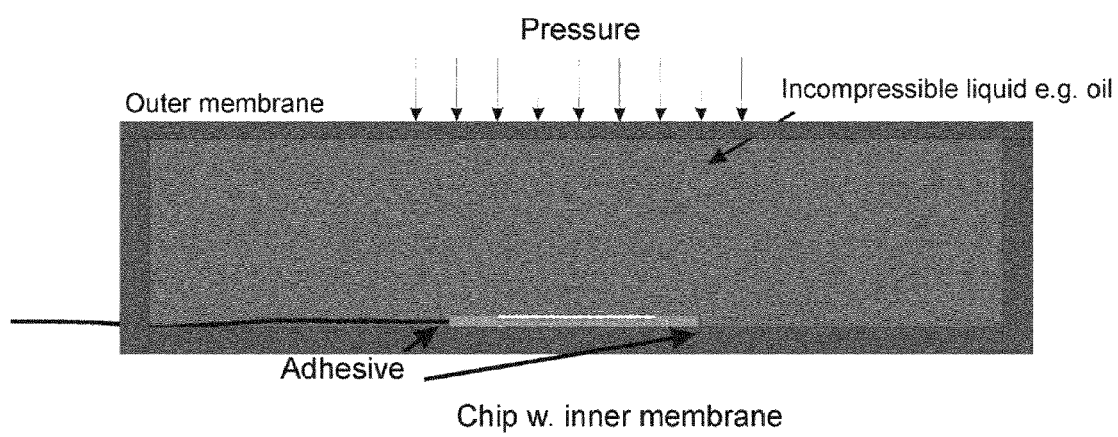
FIG. 22c is like FIG. 22b where the connection between the outer and inner membrane is provided by means of an incompressible fluid, however compared to FIG. 22b the volume of the incompressible fluid is larger.

In a further embodiment of the presently disclosed pressure sensor, the connection between the outer membrane and the inner deflecting element is provided by means of fluid, such as incompressible fluid, such as incompressible liquid, such as oil. The liquid is preferably incompressible and thus adapted transfer the pressure from the outer membrane to the inner membrane. The outer membrane and the inner deflecting element may be separated and this separation possibly forms a volume, preferably a closed volume. This volume may be filled by an incompressible fluid, such as incompressible liquid, such as oil. The pressure sensor may thus be configured such that a pressure variation submitted to the outer membrane is transferred to the inner deflecting element through an incompressible fluid or liquid, such as oil, separating the outer membrane and the inner deflecting element. This liquid should preferably be inert. The housing may for example be filled with an incompressible fluid, and wherein this incompressible fluid is configured to transfer movement of the outer membrane to the inner deflecting element. Examples are illustrated in FIGS. 22*b* and 22*c*. In FIG. 22*b* volume formed in the wall of the housing between the outer and inner membranes is filled with an incompressible liquid which transfers the pressure variation provided to the outer membrane to the waveguide chip mounted inside the housing. In FIG. 22*c* the waveguide chip is mounted in the bottom of the housing and the entire volume of the housing is filled with an incompressible liquid. The outer membrane can then be constituted by the entire upper surface of the housing, thereby possibly increasing the area of the outer membrane. The sensitivity of the pressure sensor can then be dependent on the viscosity of the liquid.

Back Chamber

As stated previously microphones typically consists of a membrane and a back chamber which is acoustically isolated from the surroundings in order to avoid acoustical short circuit. As the volume of the back chamber varies with membrane deflection, so does the pressure in the back chamber. The resulting compliance of the back chamber therefore affects the sensitivity of the pressure sensor. E.g. viscous damping caused by air being compressed in the back chamber upon downward movement of the outer membrane may have an effect on the response of the pressure sensor. In some cases this effect may be negative, however in other cases the effect of viscous damping may be positive if the goal is to increase the frequency band because the viscous damping may help to reduce the resonance of the pressure sensor.

Coupling

In one embodiment of the invention the pressure sensor further comprises a coupling element for coupling light into and/or out of the waveguide. Optimization of the coupling is important for minimizing the coupling loss. The power loss in the coupling of light into the waveguide can be reduced by improving the mode overlap between a fiber mode and the waveguide modes. With a multimode waveguide the coupling between an external light source and the waveguide may be even more important. E.g. the amplitude of higher order mode Bragg reflection peaks can be increased by adjusting the angle between a light input in the form of an optical fiber and the waveguide and the positioning of the fiber to the waveguide. This can be an advantage as it makes it easier to measure the signal for higher order modes. At zero angle (i.e. the fiber is parallel to the waveguide) the fundamental mode will typically have the highest amplitude. As the angle is changed from zero, the amplitude of the second order mode will be increased, while the first order mode will decrease in amplitude. At even greater angles the amplitude of even higher order modes will increase and at the cost of the amplitude of lower order modes. Similarly the positioning of the optical fiber with respect to the waveguide will change the amplitude of the individual peaks, as well as the number of peaks. If the optical fiber is aligned to the center of the waveguide, the fundamental mode will typically have the largest amplitude. At off-axis positions higher order mode amplitudes will increase. Thus, in one embodiment of the invention the coupling element is adapted such that light is coupled into the waveguide on-axis/symmetrical with respect to the core. In a further embodiment the coupling element is adapted such that light is coupled into the waveguide off-axis/asymmetrical with respect to the core. Further, the coupling element may be adapted such that light is coupled into the waveguide at a non-zero angle with respect to the core.

Typically the dimension of the waveguide is modulated at the Bragg grating location. Thus, a lead-in coupling directly to this region would cause variations in the coupling loss. A lead-in waveguide section with non-varying dimensions could therefore be positioned in front of the actual sensing location. Also a tapering section or a similar coupling structure between the waveguide and the optical fiber could be used for increasing mode overlap and reducing coupling loss.

A coupling structure may be provided by having one or more solid core structures as part of a waveguide chip. E.g. the hollow core waveguide is integrated in a chip and one or more solid core structures provide the optical connection in and/or out of the hollow core waveguide. This solid core structure may be tapered, such that the dimension at one end is adapted to an optical fiber and at the other end adapted to the hollow core. Further, the optical transmission in the solid core structure may be index guided or by means of a photonic crystal or the like. Examples are illustrated in FIGS. 10*a*, 10*b*, 11 and 12. In FIGS. 10*a* and 10*b* solid core waveguides are provided at each side of the hollow (air) core waveguide. The inner deflecting element in the form of a membrane is attached to the solid core structures.

The waveguide sensor chip in FIG. 11 comprises a hollow core waveguide with a circular deflecting element in the form of a membrane and a Bragg grating in the hollow core beneath the membrane. Light is coupled into and out of the hollow core waveguide via two solid core structures in the form of two index guided waveguides on each side of the hollow core. Thus, the solid core waveguides are adapted to function as coupling elements for coupling light into and/or out of the non-solid core of the non-solid core waveguide. The index guided waveguides are funnel shaped at each end to provide tapering towards the output coupling to e.g. an optical fiber but also a tapering towards the hollow core. Light is confined in these solid core index guided waveguides vertically by having a light guiding horizontal layer in the chip surrounded by cladding layers, the light guiding layer having a higher refractive index that the cladding layers, and horizontally by having four recessions/holes in the chip as seen in FIG. 11, where the lower refractive index of the air in the recessions/holes provide for confinement of the light in the cores of the solid core index guided waveguides. The shape of these recessions/holes forms the tapering sections of the solid core index guide waveguide sections. The sensor chip illustrated in FIG. 11 may provide for a low loss coupling to optical fibers at each side of the chip, because the solid core of the optical fiber can be coupled to the solid core structures at the ends of the sensor chip. The terms "vertically" and "horizontally" should be understood with reference to the drawings, because in operation the presently disclosed pressure sensor does not have to be oriented in a certain direction to function.

The overall principle illustrated in FIG. 11 may be simplified as illustrated in FIG. 12 showing a waveguide sensor chip comprising a hollow core waveguide with a circular deflecting element in the form of a membrane and a Bragg grating in the hollow core beneath the membrane. In common with the principle illustrated in FIG. 11 is that a solid core structure surrounds the non-solid core and these solid core structures function as coupling element for coupling light into and out of the non-solid core waveguide. But in the principle in FIG. 12 the cladding layers for confining the light in the vertical direction and the recessions for confining the light in the horizontal direction are omitted. A single layer for containing the light may suffer to provide for an efficient coupling of the light into and out of the core, this layer surrounded (e.g. sandwiched vertically as seen in FIG. 12) by light confining layers, e.g. in the form of ARROW layers.

Wavelengths

The present optical pressure sensor may be adapted for propagating light with a wavelength around the telecom spectrum of 1550 nm, e.g. from 1500 to 1620 nm, thereby making it possible to use standard low loss and low cost telecom optical components. In order to take advantage of low-cost interrogation monitor systems the optical microphone may in a further embodiment be adapted for propagating light with a wavelength of approximately 850 nm.

Pressure Sensor System

A further aspect of the invention is directed to a pressure sensor system incorporating one or more of the herein disclosed optical pressure sensors and furthermore comprising at least one light source, such as a broadband light source, at least one transmitting optical waveguide for guiding light from said at least one light source into (the core of) the optical pressure sensor, a detector for measuring light reflected from the Bragg reflector, and a data processor adapted for analysing variations in one or more Bragg wavelengths of the reflected light. Said at least one transmitting optical waveguide typically also functions as the optical path for the reflected signal from the waveguide and to the detector. Thus, the present invention also relates to microphone system incorporating one or more of the herein disclosed optical microphones.

In a further embodiment the pressure sensor system further comprises one or more coupling elements for coupling the light from said at least one transmitting optical waveguide into the waveguide of the optical microphone. The data processor may be adapted for frequency modulation of the reflected signal. The light source may be a broadband light source and/or a multimode light source and/or a single mode light source.

The pressure sensor system according to the invention may comprise a plurality of multiplexed optical pressure sensors, thereby possibly forming a distributed pressure sensor system. These optical pressure sensors can be multiplexed either in a serial, parallel or serial/parallel configuration. The connection between each pressure sensor can be through either optical fiber or on-chip waveguides. Time multiplexing of the reflected signal may be employed thereby avoiding the need for a unique reflection from each pressure sensor.

Correspondingly the microphone system according to the invention may comprise a plurality of multiplexed optical microphones, thereby possibly forming a distributed microphone system. These optical microphones can be multiplexed either in a serial, parallel or serial/parallel configuration. The connection between each microphone can be through either optical fiber or on-chip waveguides. Time multiplexing of the reflected signal may be employed thereby avoiding the need for a unique reflection from each microphone.

In one embodiment of the invention said at least one transmitting optical waveguide is an optical fiber. It may be an advantage to be able to control the polarization of the light, in a further embodiment of the invention the at least one transmitting optical waveguide is a polarization maintaining optical fiber, such as a Panda type PM fiber. The reflected signal will typically propagate back through the same optical fiber that is carrying the light source. Thus, a circulator may be provided to couple the reflected light into the detector.

As stated previously said one or more sensor optical waveguides may be multimode waveguides suitable for guiding a plurality of modes of the light, including the fundamental mode. Thus, consequently the data processor may be adapted for analysing variations in the Bragg wavelength of a plurality of modes of the reflected light, including the fundamental mode.

The presently disclosed pressure sensor can be utilized to monitor the characteristics of fluid, e.g. of a fluid flow. This can for example be provided by monitoring the acoustic response from a fluid flowing in e.g. a pipeline, e.g. by mounting the pressure sensor on the outside of the pipeline. The presence and/or the content of foreign objects like sand, rust, dirt, etc. in fluids like oil, water, etc., can thereby be monitored by analyzing variations in the acoustic response of fluid flow.

Seismic surveys could also be performed with the presently disclosed optical pressure sensor, both on land and underwater. The sensor can be configured to be receiver for acoustic (seismic) waves which after emission from an emitter have been reflected from the different layers in the ground or seabed.

DETAILED DESCRIPTION OF DRAWINGS

FIG. 1a illustrates the principle of a FBG with broadband light propagating through the core of the fiber from left to right. A distributed Bragg reflector in the form of a grating with a constant period Λ is made by periodically changing the refractive index of a waveguide core, in this case the fiber core. In FIG. 1b the principle is illustrated in a hollow core waveguide. The variation in refractive index acts as a mirror which is selective to a specific wavelength. At each shift in refractive index a reflection of the forward propagating wave will occur. Thus, for specific wavelengths the reflections will add up constructively as each reflection is in phase with the next one thereby providing a peak in the reflected spectrum at the Bragg wavelength $\lambda_B$ according to $$\lambda_B = 2n_{eff} \Lambda$$

where $n_{eff}$ is the average refractive index and $\Lambda$ is the grating period. If the fiber in FIG. 1a is stretched and the period $\Lambda$ of the Bragg grating is changed the Bragg wavelength will change. The simple formula also shows that the Bragg wavelength can be changed by varying the effective index $n_{eff}$ of a waveguide as illustrated in FIGS. 1b and 1c.

FIG. 1d is a perspective illustration of an exemplary embodiment of a waveguide for the present optical pressure sensor. This strip waveguide is formed as a recess in a substrate and incorporating a distributed Bragg reflector. The deflecting element is formed by another substrate lying on top of the recess thereby forming one side of the waveguide. When incorporated into an optical pressure sensor this deflecting element becomes the inner deflecting element. When a force is submitted on top of the deflecting element it will deflect and thereby change the dimension of the waveguide and thereby change the effective index of the waveguide as the effective index $n_{eff}$ is determined by $$n_{eff} = n_c \sqrt{1 - \left(\frac{\lambda_B}{2n_c d_c}\right)^2}$$

where $n_c$ is the core refractive index and $d_c$ is the core height.

An exemplary embodiment of the present optical pressure sensor in the form of an optical microphone is illustrated in FIG. 3. FIG. 3a shows a cross sectional side view with the waveguide 1 comprising a lower substrate 4, an inner deflecting element 5 and a Bragg grating 3 located on the lower substrate. The waveguide hollow core 2 is formed by the space between the inner deflecting element 5 and the lower substrate 4 thus containing the Bragg grating 3. The waveguide 1 is located inside a back chamber 8 with the outer membrane 7. The waveguide 1 is attached to the bottom of the back chamber 8 by means of connection packaging 9. The inner deflecting element 5 is connected to the outer membrane 7 by means of a connecting rod 6. The waveguide 1 is ventilated such that air, that is compressed when the inner deflecting element moves downward, can escape. This ventilation is illustrated by means of the arrow 10.

Figure 3B:
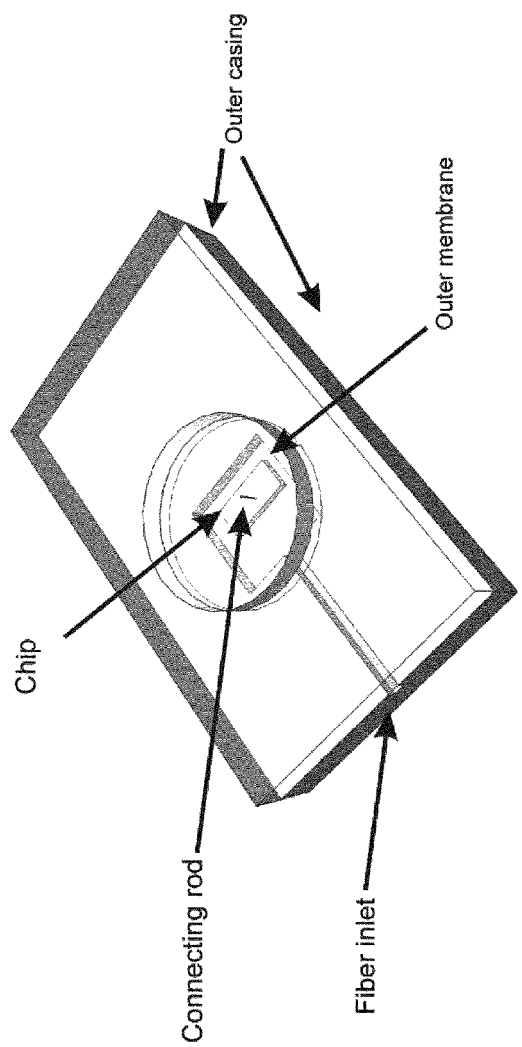
FIG. 3b is a cross sectional perspective view of the optical microphone in FIG. 3a, FIG. 3c is a photo of an example of an optical microphone according to the present invention.
Figure 3C:
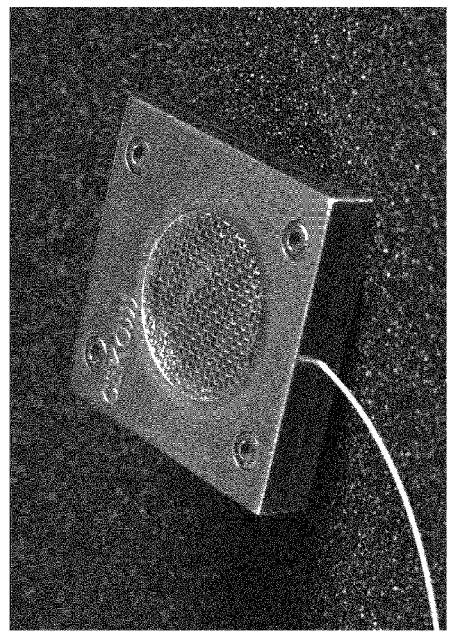
FIG. 3a is a cross sectional side view of an embodiment of the optical microphone according the present invention.

A perspective illustration of the microphone in FIG. 3a is provided in FIG. 3b. The waveguide chip 1 is visible in the bottom of the back chamber 8 located in the outer casing. The connecting rod 6 is visible providing the connection between the inner deflecting element 5 in the waveguide chip 1 to the round outer membrane 7. A fiber inlet through the outer casing provides coupling of light into the waveguide core 2. This optical microphone has been realized and a picture is shown in FIG. 3c—see example 1.

FIG. 6 shows a simple slap waveguide with a cantilever configuration, i.e. the deflecting element (the inner deflecting element) is formed as a cantilever. A Bragg grating is located on the lower part of the waveguide. A cantilever design may be an advantage for the present optical microphone because it allows for efficient ventilation of the waveguide.

In order to ensure a more uniform deflection of the inner deflecting element it may be provided with corrugations as illustrated in FIG. 4c.

There are many ways to design the waveguide for the present optical microphone, e.g. in terms of geometry of waveguide and core, and design, type, location and number of gratings. In the following a number of designs will be proposed.

The gratings may be implemented as "normal" gratings formed as protrusions from a surface as illustrated in FIG. 4a or as recesses in a surface as illustrated in FIG. 4b. The gratings can be designed in many ways to tailor specific needs in terms of wavelength spectrum, sensitivity, etc. Gratings with varying height and spacing are shown in the side view illustrations in FIGS. 5a and 5b, respectively. Gratings with different curvatures are shown in the perspective illustrations in FIGS. 5d (straight gratings) and 5c (curved gratings).

Figure 7A:
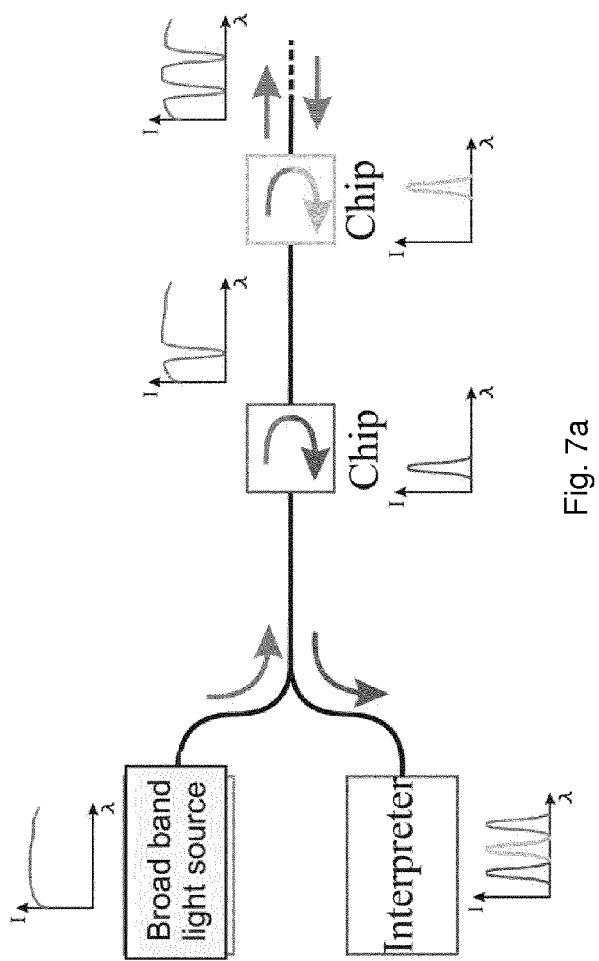
FIG. 7a-b show multiplexing of a plurality of optical sensors.
Figure 7B:
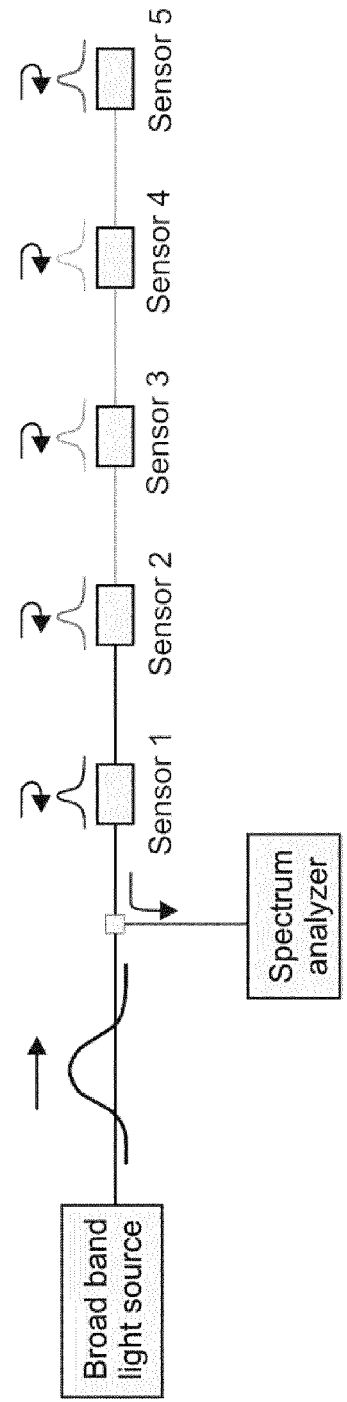

FIG. 7b shows how a plurality of optical sensors (e.g. optical pressure sensors) can be (frequency) multiplexed along the same transmission line to form a distributed optical pressure sensor system. The same principle is illustrated in FIG. 7a with a broadband light source feeding the different waveguide chips of the distributed pressure sensors. Each waveguide is designed to reflect a certain Bragg wavelength and the interpreter (e.g. a spectrum analyzer) can analyze the signal from each pressure sensor separately because the Bragg wavelengths of the waveguides and spectrally separated as illustrated in the inserts in the drawing.

The present inventors have realized that higher order modes can be desirable for sensing applications. This is described in further detail in PCT/EP2013/061701. In general higher order modes have a higher spatial variation than lower order modes, in particular higher than the fundamental mode. In multimode waveguides incorporating a Bragg grating and wherein multimoded light is propagating, several distinct peaks will be reflected from the grating due to the reflection of each mode and the coupling between the modes. Since the individual mode shapes differ in their spatial distribution, their overlap with the grating will in general differ. The difference in mode-grating overlap for the different modes is seen in the change in Bragg wavelength of the individual modes as the waveguide dimensions are changed, i.e. the wavelength sensitivity to waveguide dimensions are mode dependent. Having realized that higher orders modes may be advantageously used for sensing applications, the inventors further discovered that high sensitivity can be obtained with just simple waveguide designs. As sensing may be based on higher order mode propagation and reflection the waveguide may have a simple planar or strip geometry thereby greatly distinguishing this optical sensor from the known more complicated designs.

Thus, in a further embodiment of the invention the waveguide is suitable and/or adapted for guiding at least one higher order mode of light. Thus, the waveguide may be a multimode waveguide, where the fundamental mode of the light is guided along with a plurality of the higher order mode. The reflected spectrum from such a multimode waveguide will thus contain a plurality of peaks, each peak typically representing a mode. The signal from the pressure sensor can be inferred from the wavelength shift of one or multiple reflection peaks, or the entire reflection signal (i.e. the spectral fingerprint). Alternatively the waveguide is suitable and/or adapted for guiding single mode light. Thus, the waveguide may be a single mode waveguide, where the fundamental mode of the light is guided. Alternatively the waveguide may be a multimode waveguide, however in use only the fundamental mode of the light is guided and used.

Figure 8A:
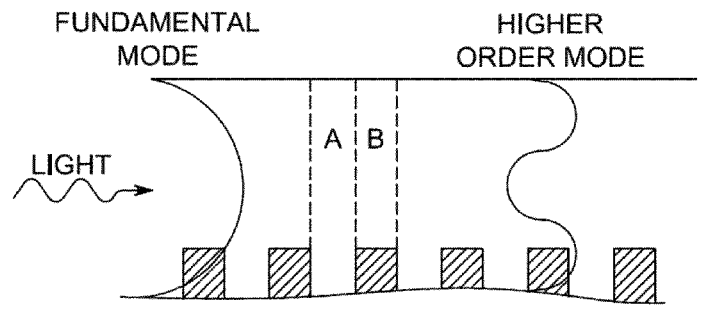
FIG. 8a illustrates examples of spatial confinement of the fundamental mode and a higher order mode propagating in a waveguide incorporating a Bragg grating.

FIG. 8a illustrates the basic principle of a multimode waveguide. The illustration shows a cross-section of the core with the light propagating from the left. The spatial confinement of the fundamental and a higher order mode is also illustrated. The protrusions at the bottom are the Bragg grating. There are different regions in the waveguide shifting between regions with only core material (illustrated as A) and regions with both core and grating material (illustrated as B). The change in spatial confinement of the mode between regions A and B, changes the effective index of the waveguide. The change in mode-grating overlap changes the geometrically averaged index which varies with the mode order.

Figure 8B:
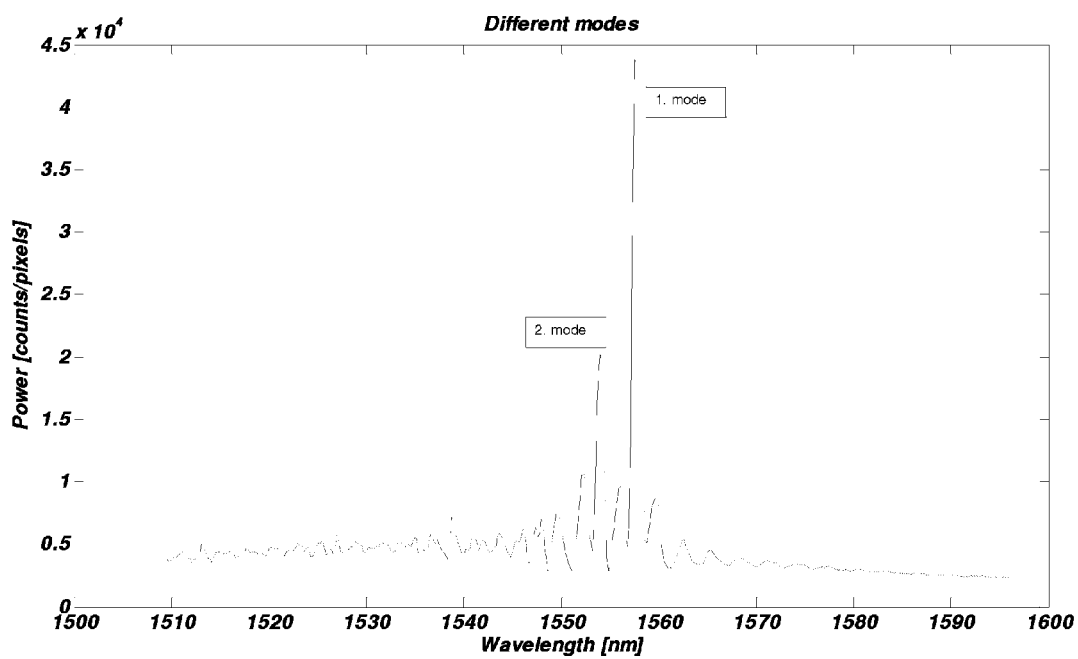
FIG. 8b shows an example of the reflection spectrum of a multimode optical sensor waveguide.

FIG. 8b shows an example of the reflected spectrum from a multimode optical sensor waveguide. Peaks from at least two modes are easily identifiable (fundamental (1.) mode and a higher order (2.) mode). Each mode propagating in the waveguide will typically provide a peak in the reflected spectrum. However, additional peaks may appear in the reflected spectrum as a result of mixing between different modes.

Example 1

A prototype optical pressure sensor in the form of an optical microphone has been realized based on the configuration illustrated in FIGS. 3a and 3b. A picture of the prototype is shown in FIG. 3c. The casing for the microphone is in aluminium and the microphone measures approx. 6×6×1.2 cm having a circular outer membrane of approx. 3.2 cm in diameter. The outer membrane is a metal foil which is press fitted into the matching circular opening of the outer casing. The slab waveguide chip is approx. 4 cm in width and approx. 6 mm long, i.e. 6 mm long in the propagation direction of the light. The height of the core is approx. 10 micro meters. The cladding layers surrounding the core is 360 nm $SiO_2$ and 220 nm $Si_3N_4$, respectively. The inner deflecting element in the form of a membrane is 2.5 cm in width (thus forming 2.5 cm of the 4 cm width), 6 mm long and with a thickness of approx. 95 micro meters and centred in the waveguide and forming part of the core. The grating is made of $SiO_2$ with circular/arc shaped protrusions and has a height of 1.1 micro meters with a period of 800 nm. The grating height therefore makes up approx. 10% of the height of the core. The entire grating is 4 mm in length, i.e. along the depth of the waveguide. The connecting rod is a stainless steel cylinder with a diameter of 0.3 mm and a length of approx. 2 mm. The fiber inlet is visible as the cable extending from the edge of the casing and this is the only input and output to the microphone. Protective cover netting is protecting the outer membrane while allowing for sound to penetrate the netting. This type of microphone can easily be realized with a reduced size of the outer casing of 2×2×0.5 cm and correspondingly an outer membrane of approx. 1 cm.

A cantilever version was also produced with the inner deflecting element attached as a 6 mm long and 95 micro meter thick cantilever with a width of 2 cm of where approx. 1.25 cm was hanging free whereas the remaining 0.75 cm was attached to the side of the waveguide. The grating had the same dimensions, i.e. 1.1 micro meters in height, 4 mm long and with an 800 nm period. However the protrusions were straight.

Figure 9A:
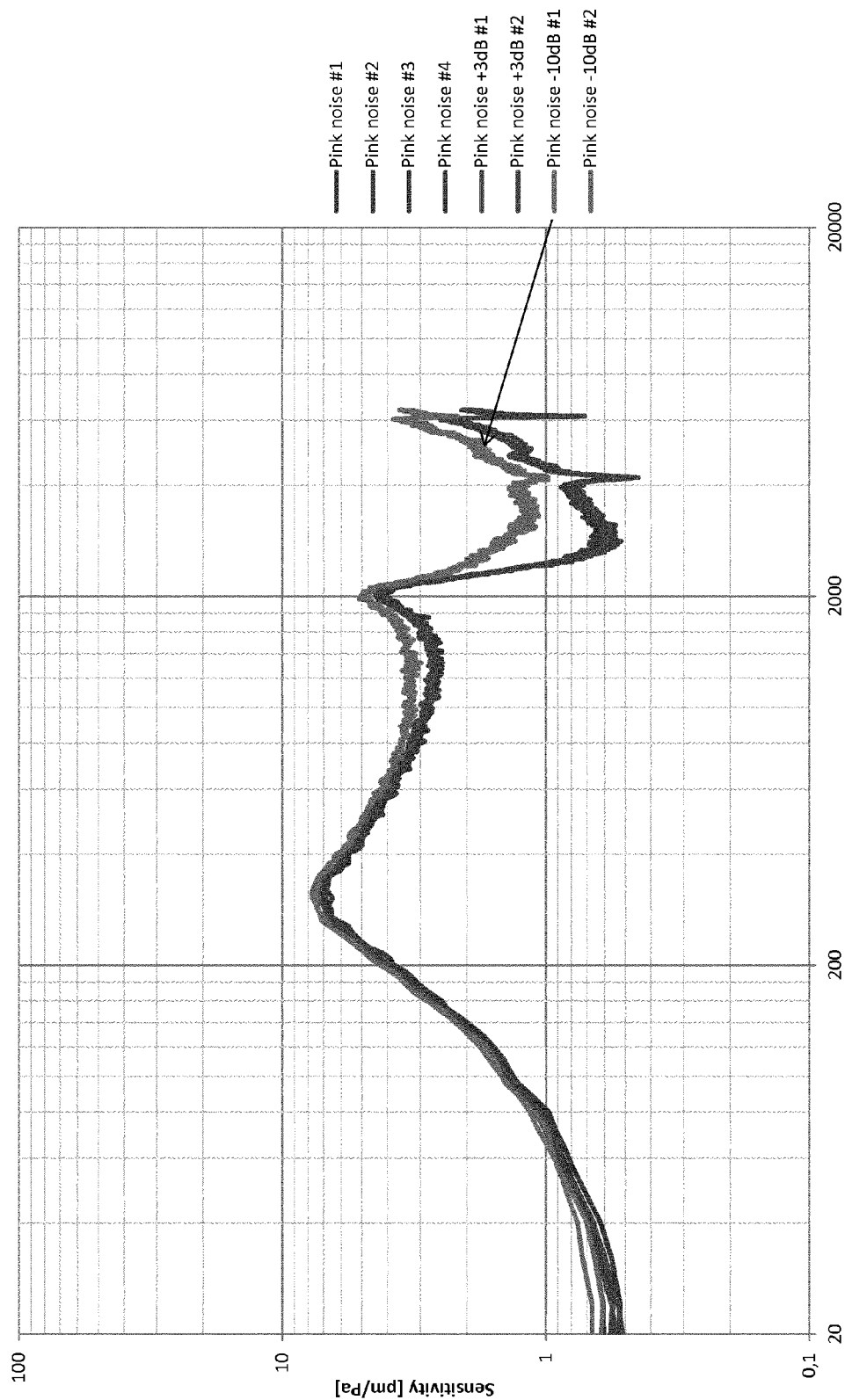
FIG. 9a shows the sensitivity of the prototype optical microphone from FIG. 3c.
Figure 9B:
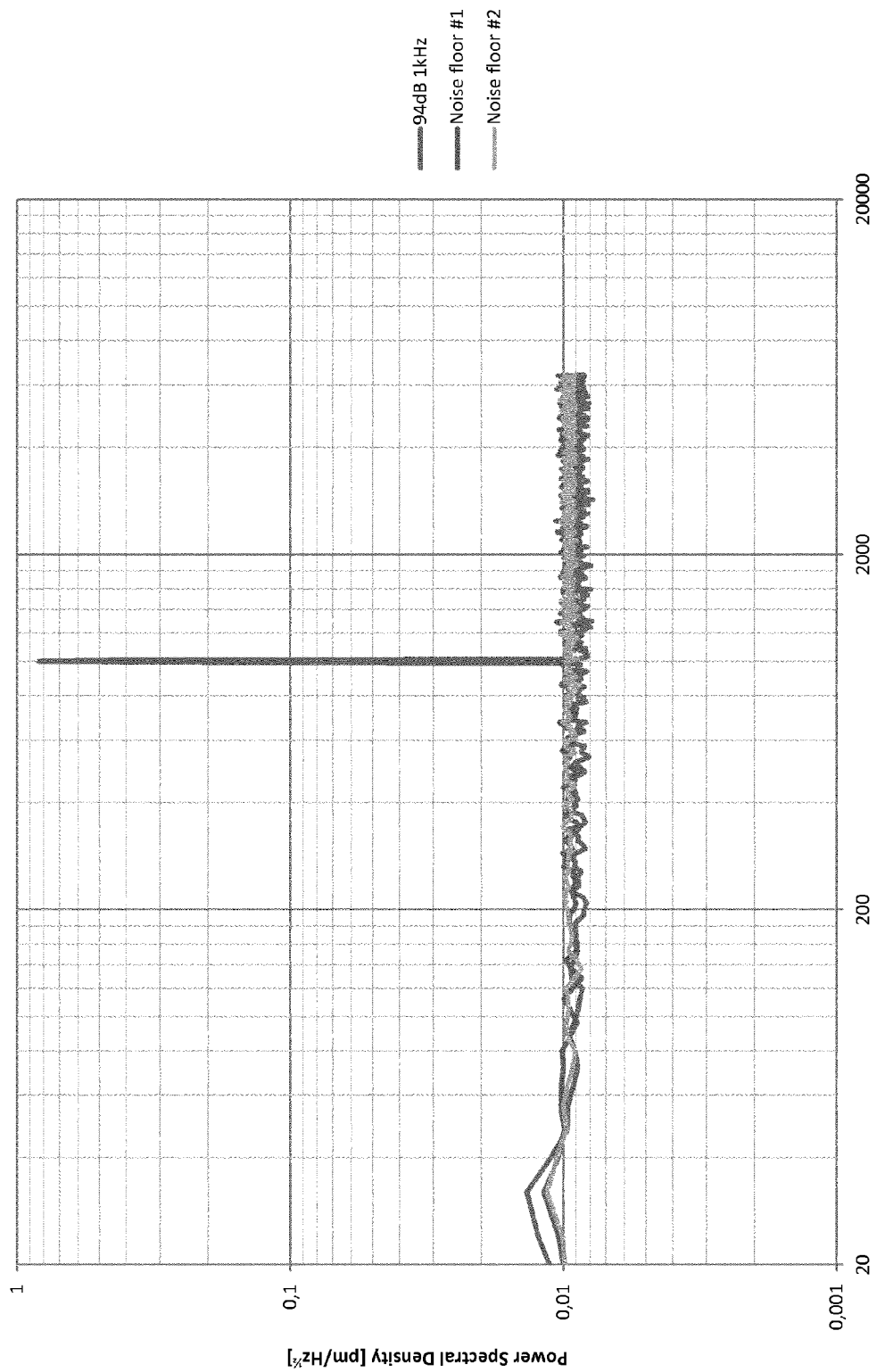
FIG. 9b shows the power spectral density of the prototype microphone from FIG. 3c.

The prototype shown in FIG. 3c has been characterized as shown in FIGS. 9a and 9b. FIG. 9a shows the frequency response of this prototype. The sensitivity in pm/Pa is plotted vs. the frequency when the microphone is excited by pink noise. The four different measurements with pink noise and the two different measurements with pink noise +3 dB are almost coincident whereas the two different measurements with pink noise −10 dB are lying above the other six curves. In a "perfect" microphone the frequency response is constant; however some frequency variation is inevitable when the microphone comprises mechanical elements like the two membranes connected via the connecting rod. FIG. 9b shows the power spectral density in pm/√Hz of the prototype optical microphone measured over the entire frequency spectrum when submitted to 94 dB of 1 kHz (1 measurement) and two measurements showing the noise floor, thereby demonstrating that no unwanted noise is coming from the microphone itself.

FURTHER DETAILS OF THE INVENTION

The invention will now be described in further details with reference to the following numbered items:
1. An optical pressure sensor comprising at least one outer membrane and a waveguide, the waveguide comprising
    at least one core for confining and guiding light,
    at least one distributed Bragg reflector located in said at least one core, and
    at least one inner deflecting element forming at least a part of the core,
    wherein the pressure sensor is configured such that the geometry and/or dimension of the at least one core is changed when the at least one outer membrane is submitted to pressure.
2. The optical pressure sensor of item 1, further comprising a back chamber.
3. The optical pressure sensor of item 2, wherein the waveguide is attached inside the back chamber.
4. An optical pressure sensor comprising a housing, at least one outer membrane, and a waveguide attached inside the housing, the waveguide comprising
    at least one core for confining and guiding light,
    at least one distributed Bragg reflector located in said at least one core, and
    at least one inner deflecting element forming at least a part of the core,
    wherein the pressure sensor is configured such that said at least one inner deflecting element is connected to the at least one outer membrane such that the geometry and/or dimension of the at least one core is changed when the at least one outer membrane is submitted to pressure, or
    wherein the pressure sensor is configured such that a connection can be established between said at least one inner deflecting element and said at least one outer membrane such that the geometry and/or dimension of the at least one core is changed when the at least one outer membrane is submitted to a predefined level of pressure.
5. The optical pressure sensor according to any of preceding items, wherein said at least one inner deflecting element is connected to the at least one outer membrane.
6. The optical pressure sensor according to any of preceding items, configured such that a connection can be established between said at least one inner deflecting element said at least one outer membrane.
7. The optical pressure sensor according to any of preceding items, configured such that a connection can be established between said at least one inner deflecting element said at least one outer membrane at and above a predefined amount of pressure submitted to the outer membrane.
8. The optical pressure sensor according to any of preceding items, configured such that the geometry and/or dimension of the at least one core is changed when the at least one outer membrane at and above a predefined amount of pressure submitted to the outer membrane.
9. The optical pressure sensor according to any of preceding items, wherein the waveguide and/or the core is having a planar geometry.
10. The optical pressure sensor according to any of preceding items, wherein the waveguide and/or the core is having a strip geometry.
11. The optical pressure sensor according to any of preceding items, wherein the waveguide and/or the core is having a rib geometry.
12. The optical pressure sensor according to any of preceding items, wherein the core is non-solid.
13. The optical pressure sensor according to any of preceding items, wherein the core is hollow.
14. The optical pressure sensor according to any of preceding items, wherein at least a part of the core is non-solid, such as hollow.
15. The optical pressure sensor according to any of preceding items, wherein at least a part of the core is solid.
16. The optical pressure sensor according to any of preceding items, wherein a part of the core is solid and a part of the core is non-solid, such as hollow.
17. The optical pressure sensor according to any of preceding items, wherein the distributed Bragg reflector is located at least partly in the core of the waveguide.
18. The optical pressure sensor according to any of preceding items, wherein a back chamber is formed by a volume separating the outer membrane and the inner deflecting element.
19. The optical pressure sensor according to any of preceding items, wherein the inner deflecting element is provided in a material different than the material of the outer membrane.
20. The optical pressure sensor according to any of preceding items, wherein the inner deflecting element is separated from the outer membrane, preferably by a predefined distance.
21. The optical pressure sensor according to any of preceding items, wherein the thickness of the inner deflecting element is different from the thickness of the outer membrane.
22. The optical pressure sensor according to any of preceding items, wherein the thickness of the inner deflecting element is less than the thickness of the outer membrane, such as less than 90%, less than 80%, less than 70%, less than 60%, less than 50%, less than 40%, less than 30%, less than 20%, less than 10%, less than 5%, less than 3%, less than 2%, or less than 1% of the thickness of the outer membrane.
23. The optical pressure sensor according to any of preceding items, wherein the flexibility and/or rigidity of the inner deflecting element is different from the flexibility and/or rigidity of the outer membrane.
24. The optical pressure sensor according to any of preceding items, wherein the inner deflecting element is connected to the outer membrane by means of at least one connecting rod.
25. The optical pressure sensor according to any of preceding items 24, wherein the connecting rod is rigid.
26. The optical pressure sensor according to any of preceding items 24, wherein the connecting rod is flexible and/or bendable.
27. The optical pressure sensor according to any of preceding items 24, wherein the connecting rod is viscoelastic.
28. The optical pressure sensor according to any of preceding items, configured such that a connection is only established between the outer membrane and the inner deflecting element at and above a predefined pressure submitted to the outer membrane.
29. The optical pressure sensor according to any of preceding items, wherein the inner deflecting element forms one side of the core.
30. The optical pressure sensor according to any of preceding items, wherein the inner deflecting element is formed as a cantilever.
31. The optical pressure sensor according to any of preceding items, wherein the inner deflecting element is formed as a plate or a membrane.
32. The optical pressure sensor according to any of preceding items, wherein the inner deflecting element is formed as a beam.
33. The optical pressure sensor according to any of the preceding items, wherein said at least one distributed Bragg reflector is a grating.
34. The optical pressure sensor according to any of the preceding items, comprising two or more distributed Bragg reflectors.
35. The optical pressure sensor according to any of the preceding items, wherein the shape of said at least one distributed Bragg reflector is apodized.
36. The optical pressure sensor according to any of the preceding items, wherein the shape of said at least one distributed Bragg reflector is chirped.
37. The optical pressure sensor according to any of the preceding items, wherein said at least one distributed Bragg reflector is formed as a plurality of structures on a surface of the waveguide.
38. The optical pressure sensor according to item 37, wherein said structures are protrusions or recesses or a combination thereof
39. The optical pressure sensor according to any of the preceding items 37 to 38, wherein the height and/or width of said structures are varying periodically.
40. The optical pressure sensor according to any of the preceding items 37 to 39, wherein the distance between said structures is varying periodically.
41. The optical pressure sensor according to any of the preceding items 37 to 40, wherein the structures are straight or curved, such as sinusoidal curved or curved as an arc or curved as a parabola.
42. The optical pressure sensor according to any of the preceding items, wherein the maximum height of the distributed Bragg reflector is less than 50% of the maximum height of the waveguide core, or less than 40%, or less than 30% or less than 25%, or less than 20%, or less than 15%, or less than 10%, or less than 5% of the maximum height of the waveguide core.
43. The optical pressure sensor according to any of the preceding items, wherein said at least one distributed Bragg reflector is located on the inner deflecting element.
44. The optical pressure sensor according to any of the preceding items, wherein said at least one distributed Bragg reflector is located on a surface of the waveguide opposite the inner deflecting element.

45. The optical pressure sensor according to any of the preceding items, wherein the maximum width of the waveguide is at least 10 times the maximum height of the waveguide, or at least 20 times, or at least 30 times, or at least 40 times, or at least 50 times, or at least 60 times, or at least 70 times, or at least 80 times, or at least 90 times, or at least 100 times the maximum height of the waveguide.

46. The optical pressure sensor according to any of the preceding items, wherein the maximum width of the core is at least 10 times the maximum height of the core, or at least 20 times, or at least 30 times, or at least 40 times, or at least 50 times, or at least 60 times, or at least 70 times, or at least 80 times, or at least 90 times, or at least 100 times the maximum core of the waveguide.

47. The optical pressure sensor according to any of the preceding items, wherein the maximum width of the waveguide is at least 1.5 times the maximum depth of the waveguide, or at least 2 times, or at least 3 times, or at least 4 times, or at least 5 times, or at least 6 times, or at least 7 times, or at least 8 times, or at least 9 times, or at least 10 times the maximum depth of the waveguide, wherein the depth of the waveguide is in the direction of the propagation of light.

48. The optical pressure sensor according to any of the preceding items, wherein the maximum width of the waveguide core is at least 1.5 times the maximum depth of the waveguide core, or at least 2 times, or at least 3 times, or at least 4 times, or at least 5 times, or at least 6 times, or at least 7 times, or at least 8 times, or at least 9 times, or at least 10 times the maximum depth of the waveguide core, wherein the depth of the waveguide core is in the direction of the propagation of light.

49. The optical pressure sensor according to any of preceding items, further comprising one or more coupling elements for coupling light into the core.

50. The optical pressure sensor according to any of the preceding items, wherein the cross-section of the core is rectangular, polygonal or circular or elliptical or any combination thereof.

51. The optical pressure sensor according to any of the preceding items, wherein the confinement of the core is substantially rectangular, polygonal or circular or elliptical.

52. The optical pressure sensor according to any of preceding items, wherein the core is having a planar geometry only.

53. The optical pressure sensor according to any of preceding items, wherein the core is having a strip geometry only.

54. The optical pressure sensor according to any of preceding items, wherein the maximum height of the distributed Bragg reflector is less than 10% of the maximum height of the core.

55. The optical pressure sensor according to any of preceding items, wherein the maximum width of the core is at least 100 times larger than the maximum height of the core.

56. The optical pressure sensor according to any of preceding items, further comprising one or more, preferably two, solid core coupling waveguides adjacent to the non-solid core waveguide.

57. The optical pressure sensor according to item 56, wherein said one or more solid core coupling waveguides are index guided solid core coupling waveguides.

58. The optical pressure sensor according to item 56, wherein said one more solid core coupling waveguides are photonic crystal or photonic band gap waveguides.

59. The optical pressure sensor according to any of the preceding items 56 to 58, wherein said one or more solid core coupling waveguides are adapted to function as coupling elements for coupling light into and/or out of the non-solid core of the non-solid core waveguide.

60. The optical pressure sensor according to any of the preceding items 56 to 59, wherein the dimension of one end of the solid core of said one or more solid core coupling waveguides is adapted to the dimension of the non-solid core of the non-solid core waveguide.

61. The optical pressure sensor according to any of the preceding items 56 to 60, wherein the dimension of one end of the solid core of said one or more solid core coupling waveguides is adapted to the dimension of a transmission waveguide, such as an optical fiber.

62. The optical pressure sensor according to any of the preceding items 56 to 61, wherein the mode field of one end of the solid core of said one or more solid core coupling waveguides is adapted to the mode field of the non-solid core waveguide.

63. The optical pressure sensor according to any of the preceding items 56 to 62, wherein the mode field of one end of the solid core of said one or more solid core coupling waveguides is adapted to the mode field of a transmission waveguide, such as an optical fiber.

64. The optical pressure sensor according to any of the preceding items 56 to 63, wherein said one or more solid core coupling waveguides are tapered at one or both ends of the coupling waveguides.

65. The optical pressure sensor according to any of the preceding items 56 to 64, wherein the non-solid core waveguide and said one or more solid core coupling waveguides are manufactured from two bonded substrates, such as silicon or pyrex or silica or fused silica substrates.

66. The optical pressure sensor according to any of the preceding items 65, wherein said one or more solid core coupling waveguides are defined vertically by at least three horizontal layers, preferably solid layers, on one of the substrates where the middle layer is having a higher refractive index that the upper and lower cladding layers.

67. The optical pressure sensor according to any of the preceding items 65, wherein said one or more solid core coupling waveguides are defined by at least three layers substantially parallel to the inner deflecting element, preferably solid layers, on one of the substrates where the middle layer is having a higher refractive index that the upper and lower cladding layers.

68. The optical pressure sensor according to any of the preceding items 65 to 67, wherein said one or more solid core coupling waveguides are defined horizontally by vertical recessions in or holes through at least one of the substrates.

69. The optical pressure sensor according to any of the preceding items 65 to 67, wherein said one or more solid core coupling waveguides are defined by recessions in or holes extending substantially perpendicular through at least one of the substrates.

70. The optical pressure sensor according to any of the preceding items 56 to 69, wherein said one or more solid core coupling waveguides are defined by at least one light guiding layer arranged substantially parallel to and below the inner deflecting element.
71. The optical pressure sensor according to any of the preceding items 70, wherein said at least one light guiding layer is surrounded by light confining layers, such as ARROW layers, wherein the light guiding layer(s) is having a higher refractive index that the light confining layers.
72. The optical pressure sensor according to any of preceding items, wherein the core comprises a least one solid ridge extending in the direction of the propagation of the light.
73. The optical pressure sensor according to any of preceding items 72, wherein the solid ridge(s) is provided in a light guiding material.
74. The optical pressure sensor according to any of preceding items 72 to 73, wherein the optical pressure sensor and/or solid ridge(s) is configured such that light propagating in the waveguide core is confined within and around said solid ridge(s).
75. The optical pressure sensor according to any of preceding items 72 to 74, wherein the solid ridge(s) is located centrally in the waveguide core.
76. The optical pressure sensor according to any of preceding items 72 to 75, wherein the solid ridge(s) is one or more straight solid ridges.
77. The optical pressure sensor according to any of preceding items 72 to 76, wherein the solid ridge(s) is extending the length of the core above the distributed Bragg deflector(s).
78. The optical pressure sensor according to any of preceding items 72 to 77, wherein the solid ridge(s) is extending the length of the core through the distributed Bragg deflector(s).
79. The optical pressure sensor according to any of preceding items 72 to 78, wherein a solid ridge is abutting the distributed Bragg deflector(s) at each side of said distributed Bragg deflector(s).
80. The optical pressure sensor according to any of preceding items 72 to 79, wherein the height of the solid ridge(s) is less than or equal to the height of the distributed Bragg deflector(s).
81. The optical pressure sensor according to any of preceding items 72 to 80, wherein the height of the solid ridge(s) is greater than the height of the distributed Bragg deflector(s).
82. The optical pressure sensor according to any of preceding items 72 to 81, wherein the width of the solid ridge(s) is less than or equal to the width of the distributed Bragg deflector(s).
83. The optical pressure sensor according to any of preceding items 72 to 82, wherein the width of the solid ridge(s) is greater than the width of the distributed Bragg deflector(s).
84. The optical pressure sensor according to any of preceding items 72 to 83, wherein the maximum height of the solid ridge(s) is less than 50% of the maximum height of the waveguide core, or less than 40%, or less than 30% or less than 25%, or less than 20%, or less than 15%, or less than 10%, or less than 5% of the maximum height of the waveguide core.
85. The optical pressure sensor according to any of preceding items 72 to 84, wherein the maximum width of the solid ridge(s) is less than 50% of the maximum width of the waveguide core, or less than 40%, or less than 30% or less than 25%, or less than 20%, or less than 15%, or less than 10%, or less than 5%, or less than 3%, or less than 2%, or less than 1% of the maximum width of the waveguide core.
86. The optical pressure sensor according to any of preceding items 72 to 85, wherein the maximum height of the solid ridge(s) is less than 90% of the maximum height of the distributed Bragg reflector, or less than 80%, or less than 70%, or less than 60%, or less than 50%, or less than 40%, or less than 40%, or less than 30% or less than 25%, or less than 20%, or less than 15%, or less than 10%, or less than 5% of the maximum height of the distributed Bragg reflector.
87. The optical pressure sensor according to any of preceding items 72 to 86, wherein the maximum height of the solid ridge(s) is at least 105% of the maximum height of the distributed Bragg reflector, or greater than 110%, or greater than 120%, or greater than 130%, or greater than 140%, or greater than 150%, or greater than 200%, or greater than 250%, or greater than 300%, or greater than 400%, or greater than 500% of the maximum height of the distributed Bragg reflector.
88. The optical pressure sensor according to any of preceding items 72 to 87, wherein the maximum width of the solid ridge(s) is less than 90% of the maximum width of the distributed Bragg reflector, or less than 80%, or less than 70%, or less than 60%, or less than 50%, or less than 40%, or less than 40%, or less than 30% or less than 25%, or less than 20%, or less than 15%, or less than 10%, or less than 5% of the maximum width of the distributed Bragg reflector.
89. The optical pressure sensor according to any of preceding items, further comprising a housing wherein the waveguide(/chip?) is incorporated.
90. The optical pressure sensor according to any of preceding items, further comprising a housing wherein the waveguide is incorporated, the housing having a top surface incorporating the outer membrane.
91. The optical pressure sensor according to any of preceding items 89 to 90, wherein the outer membrane and/or the connection between the outer membrane and the inner deflecting element is incorporated in one surface of the housing.
92. The optical pressure sensor according to any of preceding items 89 to 91, wherein the outer membrane is part of one surface of the housing.
93. The optical pressure sensor according to any of preceding items 89 to 92, wherein the outer membrane and/or the connection between the outer membrane and the inner deflecting element is provided as one or more recess in one surface of the housing.
94. The optical pressure sensor according to any of preceding items 89 to 93, wherein waveguide is attached to a surface of the housing incorporating the outer membrane.
95. The optical pressure sensor according to any of preceding items 89 to 94, further comprising a back chamber located and/or incorporated in the housing, such as in a wall of the housing.
96. The optical pressure sensor according to any of preceding items 89 to 95, wherein the waveguide is attached to an inner surface of the housing and where at least a part of said inner surface is polished.
97. The optical pressure sensor according to any of preceding items, wherein the connection between the outer membrane and the inner deflecting element is provided by means of fluid, such as incompressible fluid, such as incompressible liquid, such as oil.
98. The optical pressure sensor according to any of preceding items, wherein the outer membrane and the inner deflecting element are separated and wherein this separation forms a volume, preferably a closed volume.
99. The optical pressure sensor according to any of preceding items, wherein the outer membrane and the inner deflecting element are separated and wherein this separation forms a volume and wherein this volume is filled by an incompressible fluid, such as incompressible liquid, such as oil.
100. The optical pressure sensor according to any of preceding items, wherein the pressure sensor is configured such that a pressure variation submitted to the outer membrane is transferred to the inner deflecting element through an incompressible fluid or liquid, such as oil, separating the outer membrane and the inner deflecting element.
101. The optical pressure sensor according to any of preceding items, wherein the housing is filled with an incompressible fluid or liquid, such as oil, and wherein this incompressible fluid or liquid is configured to transfer movement of the outer membrane to the inner deflecting element.
102. The optical pressure sensor according to any of preceding items, wherein the pressure sensor is configured such that the geometry and/or dimension of the at least one core is changed when the at least one outer membrane is submitted to sound such that the optical pressure sensor is an optical microphone.
103. The optical pressure sensor according to any of preceding items, wherein the waveguide is manufactured from two bonded substrates, such as silicon or pyrex or silica or fused silica substrates, and wherein the core is formed as a recess in one of said silicon substrates.
104. The optical pressure sensor according to any of the preceding items, wherein the waveguide is suitable and/or adapted for guiding at least one higher order mode of light, such as a multimode waveguide.
105. The optical pressure sensor according to any of the preceding items, wherein the waveguide is suitable and/or adapted for guiding the fundamental mode of light.
106. The optical pressure sensor according to any of the preceding items, wherein the waveguide is attached to the bottom of the back chamber.
107. The optical pressure sensor according to any of the preceding items, wherein the waveguide is attached to the top and/or lid of the back chamber.
108. A pressure sensor system comprising
one or more optical pressure sensors according to any of the preceding items,
at least one light source, such as a broadband light source,
at least one transmitting optical waveguide for guiding light from said at least one light source into (the core of) the optical pressure sensor,
a detector for measuring light reflected from the Bragg reflector, and
a data processor adapted for analysing variations in one or more Bragg wavelengths of the reflected light.
109. The pressure sensor system according to any of preceding items 108, wherein said data processor is adapted for analysing frequency modulation of the reflected signal.
110. The pressure sensor system according to any of preceding items 108 to 109, wherein the light source is a multimode light source.
111. The pressure sensor system according to any of preceding items 108 to 110, further comprising a coupling element, such as a circulator, for coupling light reflected from said Bragg reflector into said detector.
112. The pressure sensor system according to any of preceding items 108 to 111, wherein the light source is a broadband light source.
113. A distributed pressure sensor system comprising a plurality of the optical pressure sensors according to any of preceding items 1 to 105, wherein said optical pressure sensors are multiplexed in series and/or in parallel.
114. A microphone system comprising
one or more optical pressure sensors according to any of the preceding items 1 to 105 adapted to detection of sound,
at least one light source, such as a broadband light source,
at least one transmitting optical waveguide for guiding light from said at least one light source into (the core of) the optical pressure sensor,
a detector for measuring light reflected from the Bragg reflector, and
a data processor adapted for analysing variations in one or more Bragg wavelengths of the reflected light.

What is claimed is:

1. An optical pressure sensor comprising a housing, at least one outer membrane, wherein the at least one outer membrane is incorporated in one surface of the housing, and a waveguide attached inside the housing, the waveguide comprising
at least one core for confining and guiding light,
at least one distributed Bragg reflector located in said at least one core, and
at least one inner deflecting element forming at least a part of the core, wherein the at least one inner deflecting element forms one side of the waveguide,
wherein the pressure sensor is configured such that said at least one inner deflecting element is connected to the at least one outer membrane such that the geometry and/or dimension of the at least one core is changed when the at least one outer membrane is submitted to pressure, or
wherein the pressure sensor is configured such that a connection can be established between said at least one inner deflecting element and said at least one outer membrane such that the geometry and/or dimension of the at least one core is changed when the at least one outer membrane is submitted to a predefined level of pressure,
wherein the at least one outer membrane and the at least one inner deflecting element form two separate deflecting elements.

2. The optical pressure sensor according to claim 1, wherein the waveguide and/or the core is having a planar, strip or rib geometry.

3. The optical pressure sensor according to claim 1, wherein the core is hollow.

4. The optical pressure sensor according to claim 1, wherein the distributed Bragg reflector is located at least partly in the core of the waveguide.

5. The optical pressure sensor according to claim 1, wherein the maximum width of the waveguide is at least 10 times the maximum height of the waveguide.

6. The optical pressure sensor according to claim 1, wherein the maximum width of the core is at least 100 times the maximum height of the core.

7. The optical pressure sensor according to claim 1, wherein the maximum height of the distributed Bragg reflector is less than 20% of the maximum height of the core.

8. The optical pressure sensor according to claim 1, wherein the at least one membrane is incorporated in one surface of the housing.

9. The optical pressure sensor according to claim 1, wherein the connection between the outer membrane and the inner deflecting element is incorporated in one surface of the housing.

10. The optical pressure sensor according to claim 1, wherein the outer membrane is part of one surface of the housing.

11. The optical pressure sensor according to claim 1, wherein the outer membrane and/or the connection between the outer membrane and the inner deflecting element is provided as one or more recesses in one surface of the housing.

12. The optical pressure sensor according to claim 1, wherein the connection between the outer membrane and the inner deflecting element is provided as a rod incorporated in one surface of the housing.

13. The optical pressure sensor according to claim 1, wherein the waveguide is attached to an inner surface of the housing incorporating the outer membrane.

14. The optical pressure sensor according to claim 1, wherein the waveguide is manufactured from two bonded substrates, and wherein the core is formed as a recess in one of said substrates.

15. The optical pressure sensor according to claim 1, wherein the core is hollow and wherein the sensor further comprises one or more solid core coupling waveguides adjacent to the hollow core waveguide.

16. The optical pressure sensor according to claim 15, wherein the hollow core waveguide and said one or more solid core coupling waveguides are manufactured from two bonded substrates.

17. The optical pressure sensor according to claim 15, wherein said one or more solid core coupling waveguides are defined by at least one light guiding layer arranged substantially parallel to and below the inner deflecting element.

18. The optical pressure sensor according to claim 15, wherein the core comprises a least one solid ridge extending in the direction of the propagation of the light and wherein the optical pressure sensor is configured such that light propagating in the waveguide core is confined within and around said solid ridge(s).

19. The optical pressure sensor according to claim 1, further comprising a back chamber located and/or incorporated in the housing.

20. The optical pressure sensor according to claim 1, wherein a back chamber is formed by a volume separating the outer membrane and the inner deflecting element.

21. The optical pressure sensor according to claim 19, wherein the pressure sensor is configured such that the geometry and/or dimension of the at least one core is changed when the at least one outer membrane is submitted to sound such that the optical pressure sensor is an optical microphone.

22. A pressure sensor system comprising:
at least one optical pressure sensors, wherein each optical pressure sensor comprises:
a housing, at least one outer membrane, wherein the at least one outer membrane is incorporated in one surface of the housing, and a waveguide attached inside the housing, the waveguide comprising:
at least one core for confining and guiding light,
at least one distributed Bragg reflector located in said at least one core, and
at least one inner deflecting element forming at least a part of the core, wherein the at least one inner deflecting element forms one side of the waveguide,
wherein the pressure sensor is configured such that said at least one inner deflecting element is connected to the at least one outer membrane such that the geometry and/or dimension of the at least one core is changed when the at least one outer membrane is submitted to pressure, or
wherein the pressure sensor is configured such that a connection can be established between said at least one inner deflecting element and said at least one outer membrane such that the geometry and/or dimension of the at least one core is changed when the at least one outer membrane is submitted to a predefined level of pressure,
wherein the at least one outer membrane and the at least one inner deflecting element form two separate deflecting elements, the pressure sensor system further comprising:
at least one light source, such as a broadband light source,
at least one transmitting optical waveguide for guiding light from said at least one light source into (the core of) the optical pressure sensor,
a detector for measuring light reflected from the Bragg reflector, and
a data processor adapted for analysing variations in one or more Bragg wavelengths of the reflected light.

23. The pressure sensor system according to claim 22, wherein said data processor is adapted for analysing frequency modulation of the reflected signal.

24. The pressure sensor system according to claim 22, wherein the light source is a broadband light source.

25. A distributed pressure sensor system comprising:
a plurality of optical pressure sensors, wherein each optical pressure sensor comprises:
a housing, at least one outer membrane, wherein the at least one outer membrane is incorporated in one surface of the housing, and a waveguide attached inside the housing, the waveguide comprising:
at least one core for confining and guiding light,
at least one distributed Bragg reflector located in said at least one core, and
at least one inner deflecting element forming at least a part of the core, wherein the at least one inner deflecting element forms one side of the waveguide,
wherein the pressure sensor is configured such that said at least one inner deflecting element is connected to the at least one outer membrane such that the geometry and/or dimension of the at least one core is changed when the at least one outer membrane is submitted to pressure, or
wherein the pressure sensor is configured such that a connection can be established between said at least one inner deflecting element and said at least one outer membrane such that the geometry and/or dimension of the at least one core is changed when the at least one outer membrane is submitted to a predefined level of pressure,
wherein the at least one outer membrane and the at least one inner deflecting element form two separate deflecting elements,
wherein the optical pressure sensors of said plurality of optical pressure sensors are multiplexed in series and/or in parallel.

* * * * *